US 8,082,495 B2

(12) United States Patent
Nose et al.

(10) Patent No.: US 8,082,495 B2
(45) Date of Patent: Dec. 20, 2011

(54) LABEL CREATING APPARATUS AND PROGRAM

(75) Inventors: Tetsuya Nose, Nagoya (JP); Tatsuhiro Ikedo, Ena (JP)

(73) Assignee: Brother Kogyo Kabushiki Kaisha, Nagoya-Shi, Aichi (JP)

( * ) Notice: Subject to any disclaimer, the term of this patent is extended or adjusted under 35 U.S.C. 154(b) by 1188 days.

(21) Appl. No.: 11/663,787

(22) PCT Filed: Aug. 23, 2005

(86) PCT No.: PCT/JP2005/015242
§ 371 (c)(1),
(2), (4) Date: Mar. 23, 2007

(87) PCT Pub. No.: WO2006/035559
PCT Pub. Date: Apr. 6, 2006

(65) Prior Publication Data
US 2007/0283249 A1 Dec. 6, 2007

(30) Foreign Application Priority Data
Sep. 28, 2004 (JP) .................................. 2004-282274

(51) Int. Cl.
*G06F 17/00* (2006.01)
(52) U.S. Cl. ............... 715/252; 715/209; 400/615.2; 358/1.2
(58) Field of Classification Search .......... 715/273, 715/525, 274; 358/1.11–1.8, 406; 400/76, 400/615.2
See application file for complete search history.

(56) References Cited

U.S. PATENT DOCUMENTS

| 5,188,469 A | 2/1993 | Nagao |
| 5,348,406 A | 9/1994 | Nagao |
| 5,419,648 A | 5/1995 | Nagao |
| 5,559,934 A * | 9/1996 | Ogura et al. ............ 358/1.18 |
| 5,685,654 A | 11/1997 | Nagao |
| 5,845,303 A | 12/1998 | Templeman |
| 6,109,798 A * | 8/2000 | Nunokawa et al. ......... 400/83 |
| 6,498,659 B1 * | 12/2002 | Konishi ................. 358/1.18 |
| 2004/0036915 A1 * | 2/2004 | Vleurinck et al. ......... 358/1.18 |
| 2005/0117949 A1 * | 6/2005 | Waldal ..................... 400/76 |

FOREIGN PATENT DOCUMENTS

| JP | 2106555 | 4/1990 |
| JP | 03-008063 | 1/1991 |
| JP | H6-118611 | 4/1994 |
| JP | 2000215197 | 4/2000 |
| WO | WO03/021475 | 3/2003 |

OTHER PUBLICATIONS

Hiromichi Tanahashi et al. "Fudeoh2000 Official Guide", First edition, Softbank Publishing Ltd., Oct. 21, 1999, pp. 90-93. Japan.

* cited by examiner

*Primary Examiner* — Quoc A Tran
(74) *Attorney, Agent, or Firm* — Day Pitney LLP

(57) ABSTRACT

A label creating apparatus includes a print data creating and editing device that creates and edits print data to be printed onto a long tape. The print data creating and editing device includes a storage device that stores a data file, a divided display control device, a print data selecting device, a print data creating device, a model tape display control device, a model data file display control device, a file display size determining device. If the file display size determining device determines that a model data file is not entirely displayed in the data file display area, the model data file display control device compresses the model data file so that the model data file can be entirely displayed in the data file display area.

12 Claims, 15 Drawing Sheets

LABEL CREATING APPARATUS AND PROGRAM

TECHNICAL FIELD

The present invention relates to a label creating apparatus and a program for printing label data composed of character data and figure data onto a long tape.

BACKGROUND ART

Conventionally, there have been proposed various apparatuses in which a display screen is divided and predetermined information is displayed in one of the divided portions on the display screen, whereas print document data is displayed on the remaining divided portion on the display screen.

For example, there is a document processing apparatus equipped with a guide display function (for example, see Patent Document 1). This apparatus comprises a display part capable of using a display screen by dividing into a document display area and a guide display area, a format information storage part for storing a format information of a document beforehand, a guide information storage part for storing guide information beforehand, an input part for inputting and editing a document, setting a document information and instructing to display a guide information, a document display control part for controlling the display part to display the document inputted by the input part in the document display area based on the set format information, and a guide display control part for controlling the display part to display the guide information read from the guide information storage part based on the document format information being displayed, when the instruction to display the guide information is issued from the input part, wherein the document display control part executes editing of the document displayed in the document display area with the guide information displayed in the guide display area.

In the structure described above, the guide information is displayed in the guide display area based on the document format information displayed in the document display area. Due to this structure, the document displayed in the document display area can be edited with the guide information displayed in the guide display area in a state easy to see.

[Patent Document 1] Japanese Patent Application Laid-open No. 2000-215197 (paragraphs [0060] to [0075], FIGS. 17 and 24)

DISCLOSURE OF THE INVENTION

Problem to be Solved by the Invention

However, when the conventional document processing apparatus described above is applied to a label creating apparatus in which one of the divided display screens displays a model tape indicative of the tape print layout as a tape display area whereas the remaining divided display screen displays a model data file that stores a plurality of label data as a data file display area, there arises a problem that the number of label data capable of displaying at one time on the data file display area is limited and the operation of selecting label data to be printed becomes complicated. In addition, if a data file is composed of a plurality of element data composed of combinations of plural kinds of label data, the combinations of these plural kinds of label data are respectively displayed. Thus, there arises a problem that the number of label data capable of displaying at one time in the data file display area is further limited and the operation of selecting label data to be printed becomes more complicated.

The present invention has been made to solve the problems described above, and an objective thereof is to provide a label creating apparatus capable of displaying the entire label data stored in the data file into the data file display area, and capable of easily selecting the label data to be printed. Another objective of the present invention is to provide a label creating apparatus capable of displaying a desired kind of label data among plural kinds of label data stored in the data file into the data file display area, and capable of easily selecting the label data to be printed.

To achieve the above object, according to aspect, there is provided a label creating apparatus having a print data creating and editing device that creates and edits print data to be printed onto a long tape, the print data creating and editing device comprising: a storage device that stores a data file that stores a plurality of label data composed of character data and figure data; a divided display control device that performs display control to display a display screen of a display device in a state of being divided into a tape display area for displaying the tape and a data file display area for display the data file; a print data selecting device capable of selecting plural pieces of label data from the data file displayed in the data file display area; a print data creating device that creates print data to be printed on the tape from the label data selected by the print data selecting device; a model tape display control device that creates a model tape indicative of a state where the print data is printed on the tape, and displays the model tape in the tape display area; a model data file display control device that creates a model data file indicative of a state where a plurality of label data stored in the data file are arranged in a predetermined matrix, and displays the plural label data in the data file display area; and a file display size determining device that determines whether or not the model data file is entirely displayed in the data file display area, wherein, if the file display size determining device determines that the model data file is not entirely displayed in the data file display area, the model data file display control device compresses the model data file so that the model data file can be entirely displayed in the data file display area.

Further, according to claim 2, in the label creating apparatus set forth in claim 1, if the file display size determining means determines that the model data file is not entirely displayed in the data file display area, the divided display control means compresses the tape display area in a predetermined direction on the display screen, and at the same time, expands the data file display area in the predetermined direction.

Further, according to claim 3, in the label creating apparatus set forth in claim 1 or 2, the print data creating and editing means comprises an instructing means that instructs to display the model data file in a parallel state by repeatedly turning the model data file at a lower end portion of the data file display area, and if the file display size determining means determines that the model data file cannot be entirely displayed in the data file display area and if displaying the model data file in the parallel state is instructed via the instructing means, the model data file display control means performs display control to display the model data file in a parallel state by repeatedly turning the model data file at the lower end portion of the data file display area.

Further, according to claim 4, in the label creating apparatus set forth in one of claims 1 to 3, the print data creating and editing means comprises a tape display size determining means that determines whether or not the model tape is entirely displayed in the tape display area, and if the tape display size determining means determines that the model tape is not entirely displayed in the tape display area, the model tape display control means performs control such that the model tape is compressed to be entirely displayed in the tape display area.

Further, according to claim 5, in the label creating apparatus set forth in one of claims 1 to 4, the print data creating and editing means comprises a layout change instructing means that instructs to switch a display layout from one to the other between a first divided displayed state where the display screen is vertically divided into upper and lower portions in which the tape display area and the data file display area are displayed respectively, and a second divided displayed state where the display screen is laterally divided into left and right portions in which the tape display area and the data file display area are displayed respectively, and if changing the display layout is instructed via the layout change instructing means, the divided display control means performs display control such that the tape display area and the data file display area are displayed in the other display state.

Further, according to claim 6, in the label creating apparatus set forth in one of claims 1 to 5, the data file includes an element data file that stores plural pieces of element data composed of a combination of plural kinds of label data, the model data file includes a model element data file indicative of a state where combinations of plural kinds of fields each corresponding to the respective plural kinds of label data are arranged in a row direction of the predetermined matrix, whereas the element data are arranged in a column direction of the predetermined matrix, the print data creating and editing means comprises a field selecting means that selects a field to be displayed in the data file display area from plural kinds of fields in the model element data file, and if a field is selected via the field selecting means, the model data file display control means performs display control such that a second model element data file indicative of a state where only the selected field of the model element data file is arranged in the row direction of the predetermined matrix is created and the second model element data file is displayed in the data file display area.

Further, according to another aspect, there is provided a program for allowing a computer to serve as print data creating and editing device that creates and edits print data to be printed on a long tape of a label creating apparatus, comprising: a storage device that stores a data file that stores a plurality of label data composed of character data and figure data;

a divided display control device that performs display control to display a display screen of display device in a state of being divided into a tape display area for display the tape and a data file display area for display the data file;

a print data selecting device capable of selecting plural pieces of label data from the data file displayed in the data file display area;

a print data creating device that creates print data to be printed on the tape from the label data selected by the print data selecting device;

a model tape display control device that creates a model tape indicative of a state where the print data is printed on the tape, and displays the model tape in the tape display area; a model data file display control device that creates a model data file indicative of a state where a plurality of label data stored in the data file are arranged in a predetermined matrix, and displays the plural label data in the data file display area; and a file display size determining device that determines whether or not the model data file is entirely displayed in the data file display area, wherein, if the file display size determining device determines that the model data file is not entirely displayed in the data file display area, the model data file display control device is caused to compress the model data file so that the model data file can be entirely displayed in the data file display area.

Further, according to claim 8, in the program set forth in claim 7, if the file display size determining means determines that the model data file is not entirely displayed in the data file display area, the divided display control means is caused to compress the tape display area in a predetermined direction on the display screen, and at the same time, to expand the data file display area in the predetermined direction.

Further, according to claim 9, the program set forth in claim 7 or 8, comprises a program for allowing a computer to serve as an instructing means that instructs to display the model data file in a parallel state by repeatedly turning the model data file at a lower end portion of the data file display area, wherein, if the file display size determining means determines that the model data file cannot be entirely displayed in the data file display area and if displaying the model data file in the parallel state is instructed via the instructing means, the model data file display control means is caused to perform display control to display the model data file in a parallel state by repeatedly turning the model data file at the lower end portion of the data file display area.

Further, according to claim 10, the program set forth in one of claims 7 to 9, comprises a program for allowing a computer to serve as a tape display size determining means that determines whether or not the model tape is entirely displayed in the tape display area, wherein, if the tape display size determining means determines that the model tape is not entirely displayed in the tape display area, the model tape display control means is caused to perform control such that the model tape is compressed to be entirely displayed in the tape display area.

Further, according to claim 11, the program set forth in one of claims 7 to 10, comprises a program for allowing a computer to serve as a layout change instructing means that instructs to switch a display layout from one to the other between a first divided displayed state where the display screen is vertically divided into upper and lower portions in which the tape display area and the data file display area are displayed respectively, and a second divided displayed state where the display screen is laterally divided into left and right portions in which the tape display area and the data file display area are displayed respectively, wherein, if changing the display layout is instructed via the layout change instructing means, the divided display control means is served to display the tape display area and the data file display area in the other display state.

Further, according to claim 12, in the program set forth in one of claims 7 to 11, the data file comprising an element data file that stores plural pieces of element data composed of a combination of plural kinds of label data, wherein the model data file comprises a model element data file indicative of a state where combinations of plural kinds of fields each corresponding to each of the plural kinds of label data are arranged in a row direction of the predetermined matrix, whereas the element data are arranged in a column direction of the predetermined matrix, wherein the program allows a computer to serve as a field selecting means that selects a field to be displayed in the data file display area from plural kinds of fields in the model element data file, wherein, if a field is selected via the field selecting means, the model data file display control means is caused to perform display control such that a second model element data file indicative of a state where only the selected field of the model element data file is arranged in the row direction of the predetermined matrix is created and the second model element data file is displayed in the data file display area.

Effects of the Invention

In the label creating apparatus, the print data creating and editing device divides the display screen of the display device into a tape display area in which the tape is displayed and a data file display area in which the data file is displayed. Further, the print data creating and editing device creates a model data file indicative of a state where a plurality of label data to be stored in the data file are arranged in a predetermined matrix, and displays them. Then, if label data is selected from the model data file displayed in the data file display area, the print data creating and editing device creates print data to be printed on the tape from this selected label data. Further, the print data creating and editing device displays the model tape indicative of the state where this print data is printed on the tape into the tape display area. Further, if the model data file is not entirely displayed in the data file display area, the print data creating and editing device compresses this model data file to display it entirely in the data file display area.

In this manner, if the model data file indicative of the state where a plurality of label data to be stored in the data file are arranged in a predetermined matrix cannot be entirely displayed in the data file display area, this model data file is compressed and is entirely displayed in the data file display area. Thus, the user can easily know the label data stored in the data file, and can quickly select the label data to be printed on the tape. At the same time, a problem that a label data is not accidentally selected can be assuredly prevented.

Further, in the label creating apparatus according to claim 2, if the model data file is not entirely displayed in the data file display area, the tape display area is compressed in a predetermined direction on the display screen whereas the data file display area is expanded in this predetermined direction. As a result, the data file display area is enlarged and the model data file to be displayed in the data file display area can be displayed in a larger size. Thus, the user can easily know the label data stored in the data file, and can quickly select the label data to be printed on the tape. At the same time, a problem that a label data is not accidentally selected can be assuredly prevented.

Further, in the label creating apparatus according to claim 3, if the model data file cannot be entirely displayed in the data file display area, and the displaying the model data file in a parallel state is instructed by the instructing means, the model data file is displayed in a parallel state by repeatedly turned at the lower end portion of the data file display area. In this manner, it is possible to prevent the character size of the model data file displayed in the data file display area from being compressed, and also to display a larger number of label data on the data file display area. Thus, the user can easily know the label data stored in the data file, and can quickly select the label data to be printed on the tape. At the same time, a problem that a label data is not accidentally selected can be assuredly prevented.

Further, in the label creating apparatus according to claim 4, if the model tape indicative of the state where print data is printed on the tape cannot be entirely displayed in the tape display area, the model tape is compressed to be entirely displayed in the tape display area. Thus, the user can assuredly confirm the print layout of the tape, thereby achieving this enhanced operability. Further, when the model tape is compressed, the tape display area in which the model tape is displayed can be compressed in a predetermined direction. Accordingly, the data file display area can be expanded in the predetermined direction, and thus, the model data file can be enlarged as much as possible to entirely display it.

Further, in the label creating apparatus according to claim 5, by instructing to change the display layout of the display screen via the layout change instructing means, it is possible to alternately switch the displayed state between a first divided displayed state where the display screen is divided into the upper and lower portions in which the tape display area and the data file display area are displayed respectively, and a second divided displayed state where the display screen is divided into the left and right portions in which the tape display area and the data file display area are displayed respectively. Thus, the user can display either one of the model data file or the model tape with preference to the other, thereby achieving this further enhanced operability of creating a label printed with label data.

Further, in the label creating apparatus according to claim 6, combinations of plural kinds of fields each corresponding to plural kinds of label data are arranged in a row direction of a predetermined matrix. Further, a model element data file indicative of the state where element data are arranged in a column direction of the predetermined matrix is created and displayed in the data file display area. Further, if the field to be displayed in the data file display area is selected from the plural kinds of filed of this model element data file, a second model element data file indicative of the state where only the fields selected from the model element data file are arranged in a row direction of the predetermined matrix is created, and displayed in the data file display area.

In this manner, the user can allow only the field of the label data desired to be printed on the tape to be displayed into the data file display area, thereby achieving this further enhanced operability of creating a label printed with label data. Further, since the number of the kinds of label data displayed in the data file display area is reduced, when the label data is displayed in a state of repeatedly turned, the character size of the label data displayed in the data file display area can be enlarged. As a result, selection of label data can be more easily performed.

Further, in the program according to the second aspect, when the computer reads the program, the compute divides the display screen of the display device into a tape display area in which the tape is displayed and a data file display area in which the data file is displayed. Further, the computer creates a model data file indicative of a state where a plurality of label data to be stored in the data file are arranged in the predetermined matrix, and displays them. Then, if the label data is selected from the model data file displayed in the data file display area, the computer creates print data to be printed on the tape from this selected label data. Further, the computer displays the model tape indicative of the state where this print data is printed on the tape into the tape display area. Further, if the model data file is not entirely displayed in the data file display area, the computer compresses this model data file to display it entirely in the data file display area.

In this manner, if the model data file indicative of the state where a plurality of label data to be stored in the data file are arranged in the predetermined matrix cannot be entirely displayed in the data file display area, the computer compresses this model data file to display it entirely in the data file display area. Thus, the user can easily know the label data stored in the data file, and can quickly select the label data to be printed on the tape. At the same time, a problem that a label data is not accidentally selected can be assuredly prevented.

Further, in the program according to claim 8, when the computer reads the program, if the computer cannot entirely display the model data file in the data file display area, the computer compresses the tape display area in a predetermined direction on the display screen whereas expands the data file display area in this predetermined direction. As a result, the data file display area is enlarged and the model data file to be displayed in the data file display area can be displayed in a larger size. Thus, the user can easily know the label data stored in the data file, and can more quickly select the label data to be printed on the tape. At the same time, a problem that a label data is not accidentally selected can be assuredly prevented.

Further, in the program according to claim 9, when the computer reads the program, if the computer cannot entirely display the model data file in the data file display area, and the computer is instructed to display the model data file in a parallel state by the instructing means, the computer displays the model data file in a parallel state by repeatedly turned at the lower end portion of the data file display area. In this manner, it is possible to prevent the character size of the model data file displayed in the data file display area from being compressed, and also to display a larger number of label data on the data file display area. Thus, the user can more easily know the label data stored in the data file, and can quickly select the label data to be printed on the tape. At the same time, a problem that a label data is not accidentally selected can be assuredly prevented.

Further, in the program according to claim 10, when the computer reads the program, if the computer cannot entirely display the model tape indicative of the state where print data is printed on the tape in the tape display area, the computer compresses the model tape to entirely display it in the tape display area. Thus, the user can assuredly confirm the print layout of the tape, thereby achieving this enhanced operability. Further, when the model tape is compressed, the tape display area in which the model tape is displayed can be compressed in a predetermined direction. Accordingly, the data file display area can be expanded in the predetermined direction, and thus, the model data file can be enlarged as much as possible to entirely display it.

Further, in the program according to claim 11, when the computer reads the program, if the computer is instructed to change the display layout of the display screen via the layout change instructing means, the computer alternately switches the displayed states between a first divided display state where the display screen is divided into the upper and lower portions in which the tape display area and the data file display area are displayed respectively, and a second divided display state where the display screen is divided into the left and right portions in which the tape display area and the data file display area are displayed respectively. Thus, the use can display either one of the model data file or the model tape with preference to the other, thereby achieving this further enhanced operability of creating a label printed with label data.

Further, in the program according to claim 12, when the computer reads the program, the computer arranges combinations of plural kinds of fields each corresponding to plural kinds of label data in a row direction of the predetermined matrix by reading the program. Further, the computer creates a model element data file indicative of the state where element data are arranged in a column direction of the predetermined matrix and displays it in the data file display area. Further, if the field to be displayed in the data file display area is selected from the plural kinds of fields of this model element data file via field selecting means, the computer creates a second model element data file indicative of the state where only the fields selected from the model element data file are arranged in a row direction of the predetermined matrix, and displays it in the data file display area.

In this manner, the user can allow to display only the field of the label data desired to be printed on the tape into the data file display area, thereby achieving this further enhanced operability of creating a label printed with label data. Further, since the number of the kinds of label data displayed in the data file display area is reduced, when the label data is displayed in a state of repeatedly turned, the character size of the label data displayed in the data file display area can be enlarged. As a result, selection of label data can be more easily performed.

SUMMARY OF THE DISCLOSED EMBODIMENTS

According to an aspect of the disclosed embodiments, if a model data file 84 cannot be entirely displayed in the data file display area 82, the display scale of the model data file 84 is compressed to make display setting such that the coordinate X3, Y3 on the right end portion at the lower end side in the column direction of the model data file 84 is displayed on the lower edge portion of the data file display area 82. Further, the tape display area 81 is compressed by about 57% in the vertical direction of the screen, and accordingly, the data file display area 82 is expanded in the vertical direction of the screen. At the same time, display setting is made such that the coordinate X3, Y3 on the display screen at the right end portion at the lower end side in the column direction of the model data file 84 is displayed on the lower edge portion of the expanded data file display area 82.

EXPLANATION OF REFERENCE CODES

Figure 1:
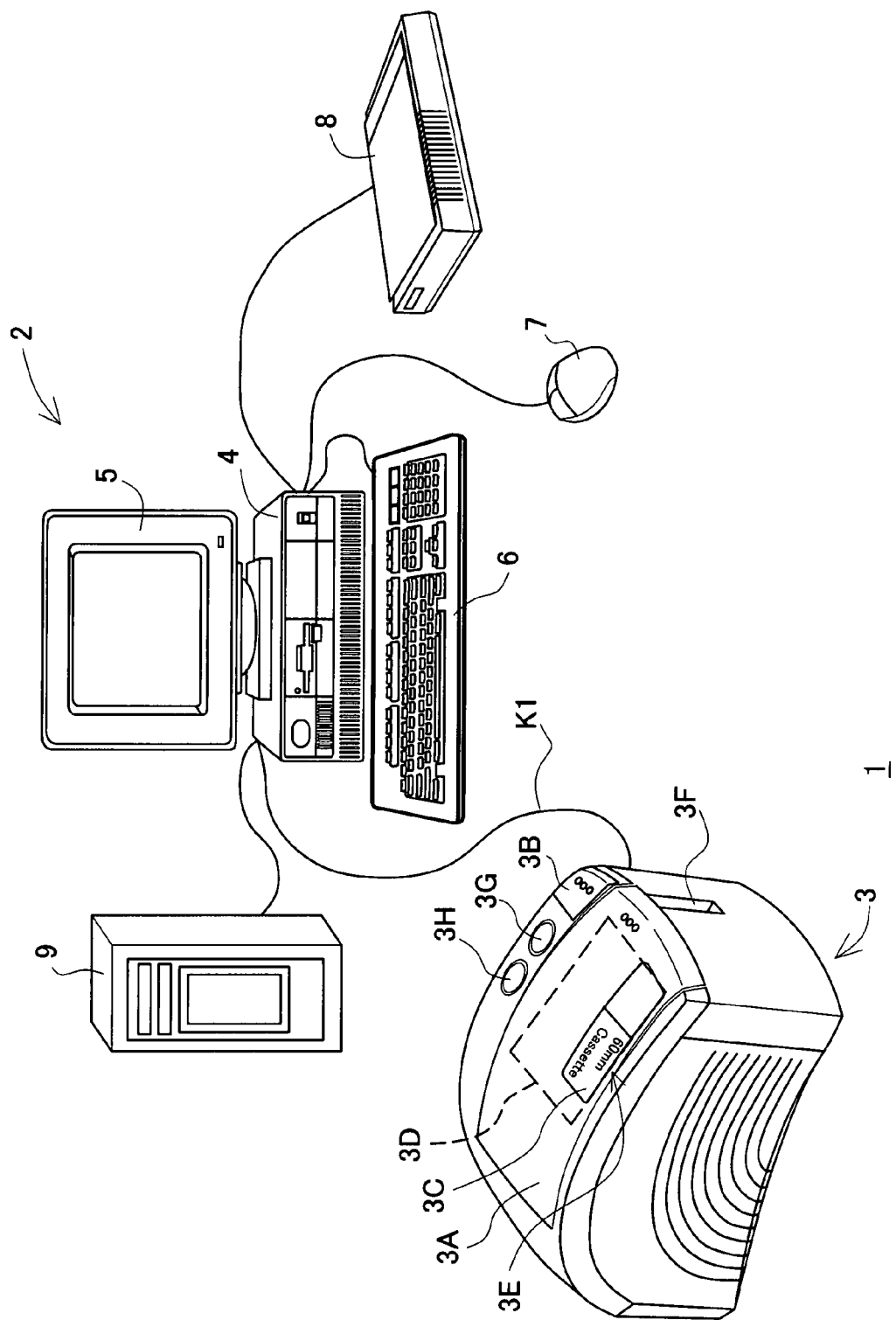
FIG. 1 is a schematic perspective diagram of a label crating apparatus according to the present embodiment.

1 Label creating apparatus
2 Computer system
3 Taper printer
3D Tape cassette
4 Host controller
5 Display device
6 Keyboard
7 Mouse
41 CPU
42 ROM
43 RAM
431 Data of a model data file
81 Tape display area
82 Data file display area
83 Model tape
84, 88 Model data file
85 Parallel display button
86 Layout change button
91 Field change screen
92, 93, 95, 96, 97 Check blank
98 OK button
99 CANCEL button

BEST MODE FOR CARRYING OUT THE INVENTION

A detailed description of a preferred embodiment of a label creating apparatus according to the present invention will now be given referring to the accompanying drawings.

Embodiment 1

As shown in FIG. 1, a label creating apparatus 1 in the present embodiment comprises computer equipment 2 including a personal computer and others and a tape printer 3 connected to the computer equipment 2 through a signal cable K1.

Further, the computer equipment 2 comprises a host controller 4, a display device (e.g. CRT, LDC, PD) 5, a keyboard 6, a mouse 7, an image scanner 8, and a CD read and writer (CD-R/W) 9. The mouse 7 may be replaced with a joystick, a track ball, or the like. The CD-R/W 9 may be replaced with a MO drive, a DVD drive, or the like.

The tape printer 3 is a printer in which a tape cassette 3D (see FIG. 2) mentioned later is installed. This tape cassette 3D contains a long print tape of a predetermined width or less (approx. 70 mm or less in the present embodiment) having an adhesive medium on a back side. The tape printer 3 performs printing on the adhesive-backed print tape on which desired characters and others are printed based on a print command from the computer equipment 2.

Herein the tape printer 3 comprises a main body whose top face including an opening/closing cover 3A which is openable and closable. On pressure of an open/close button 3B arranged on a corner of the top face of the main body, the opening/closing cover 3A is unlocked from the main body, so that the opening/closing cover 3A is caused to open by operation of a biasing member not shown.

The opening/closing cover 3A, in a forward slanting portion, is formed with a see-through window 3C covered with a transparent cover. Under this see-through window 3C, a cassette housing is provided in which the tape cassette 3D mentioned later is installed (as shown by a broken line in FIG. 3; see FIG. 2). The tape cassette 3D is provided with a tape type identification part 3E on the top face. This tape type identification part 3E is visible from outside of the tape printer 3 through the see-through window 3C.

The tape type identification part 3E indicates for example the tape width, color, and others of the long print tape with an adhesive material, installed in the tape cassettes 3D. Incidentally, the tape type identification part 3E shown in FIG. 1 indicates that the width of the tape installed in the tape cassette 3D is 60 mm, and the type and the like of the tape cassette 3D can also be checked through the see-through window 3C. The tape printer 3 is further formed, on its side wall, with a tape discharging port 3F through which the printed tape is discharged outside. The adhesive-backed print tape on which desired characters have been printed based on the print command from the computer equipment 2 is discharged through the tape discharge port 3F.

A button 3G adjacent to the open/close button 3B of the main body is a power button with which the tape printer 3 is powered on or off. Further, a button 3H adjacent to the power button 3G is a cutter drive button to start to drive a cutter mechanism (see FIG. 2) provided in the main body, and will be mentioned later. Upon operation of the cutter driving button 3H, the tape on which the characters have been printed is cut in a desired length as an adhesive-backed label of the desired length.

Next, a print mechanism of the tape printer 3 in which the tape cassette 3D is installed will be explained referring to FIG. 2.

Figure 2:
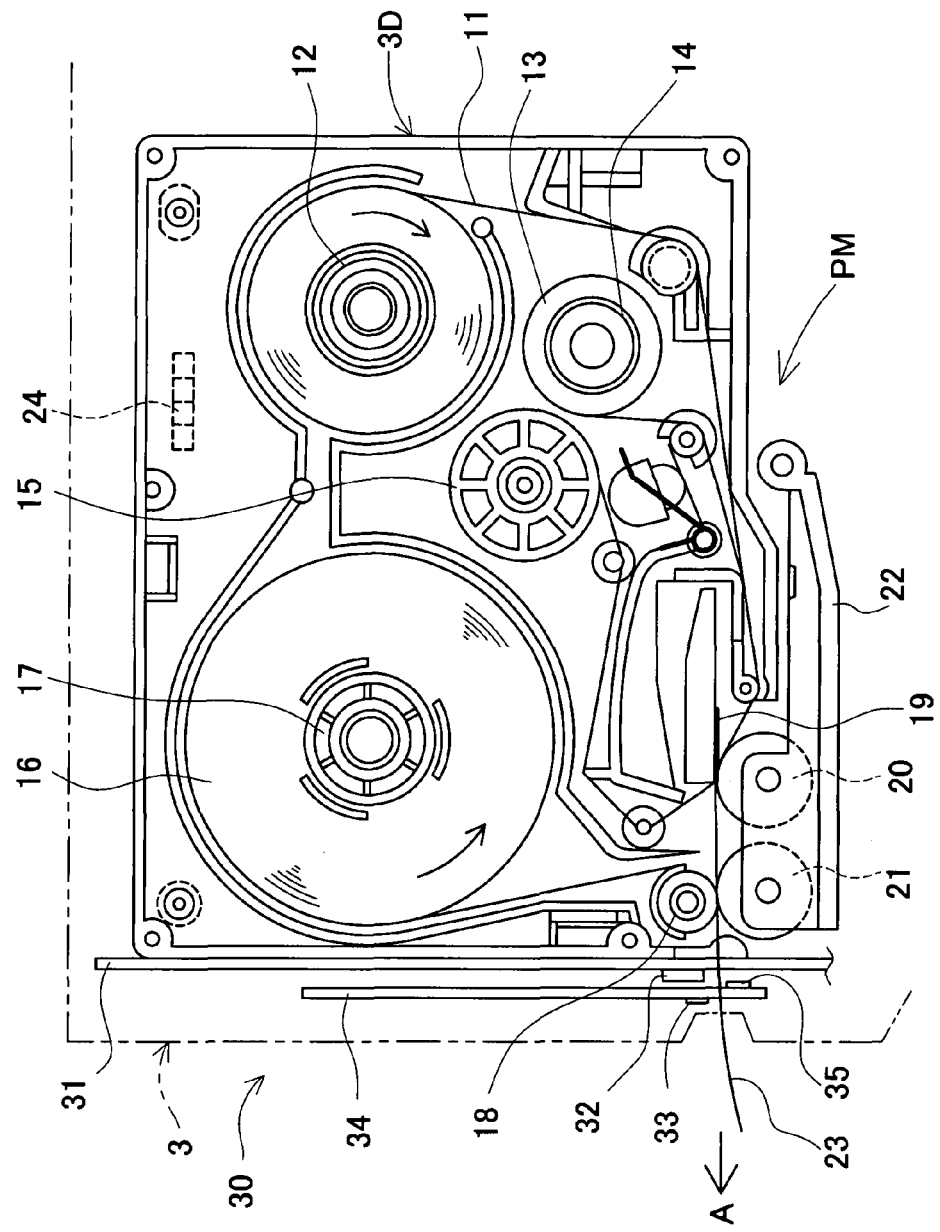
FIG. 2 is a plan view showing a schematic structure of the case where a tape cassette is mounted onto a tape printing mechanism of a tape printer of the label creating apparatus according to the present embodiment.

As shown in FIG. 2, the rectangular tape cassette 3D is removably installed in the print mechanism PM. Rotatably arranged in this tape cassette 3D are a tape spool 12 on which a laminated film tape 11 is wound, a ribbon supply spool 14 on which an ink ribbon 13 is wound, a take-up spool 15 which reels up this ribbon 13, a supply spool 17 on which a double-sided adhesive tape 16 having the same width with the laminated film tape 11 is wound with a release paper facing outside, and a press roller 18 which bonds the laminated film tape 11 and the double-sided adhesive tape 16 together.

A thermal head 19 is uprightly placed on a position where the laminated film tape 11 and the ink ribbon 13 are brought to overlap each other. A platen roller 20 and a feed roller 21 are turnably supported by a support body 22 which is pivotally provided in a main frame of the tape printer 3. The platen roller 20 presses those laminated film tape 11 and ink ribbon 13 against the thermal head 19. The feed roller 21 presses the laminated film tape 11 and the double-sided adhesive tape 16 against the press roller 18 to form a print tape 23. This thermal head 19 includes a heating element group comprising five-hundred-and-twelve heating elements vertically arranged in rows.

Accordingly, when a tape feed motor 72 (see FIG. 4) is activated in a predetermined rotating direction, the press roller 18 and the take-up spool 15 are synchronously rotates in respective predetermined rotating directions. When the heating element group of the thermal head 19 is energized during movements of the press roller 18 and the take-up spool 15, characters, bar codes, and the like are printed in multiple dot lines on the laminated film tape 11. Then, the printed laminated film tape 11 is adhered to the double-sided adhesive tape 16 and fed as a print tape 23 in a tape feed direction A and discharged outside through the tape discharge port 3F. It is noted that the printing mechanism PM are substantially the same as the mechanism disclosed in for example Japanese patent application laid-open No. 2(1990)-106555. Thus, the detailed explanation of the printing mechanism PM is herein omitted.

Next, a cutter 30 for automatically cutting the print tape 23 will be briefly explained. A plate-like supplemental frame 31 is vertically provided in immediately inside portion of a main frame of the tape printer 3 which corresponds to the left side of the tape cassette 3D, and a fixed blade 32 is upwardly fixed to the supplemental frame 31. A front-end vicinity portion of an operation lever 34 extending in a backward-forward direction is turnably supported by a left-right directional pivotally supporting axis 33 fixed to the supplemental frame 31. A movable blade 35 is mounted to oppose the fixed blade 32 in a position corresponding to a forward side from the pivotally supporting axis 33 of the operation lever 34. A rear end portion of the operation lever 34 is formed of a pivotal drive mechanism (not shown) connected to a cutting motor 74 (see FIG. 4) to be vertically pivotable. In a normal mode, the movable blade 35 is maintained spaced away from the fixed blade 32.

The print tape 23, on which printing has been performed by the thermal head 19 is guided from the tape cassette 3D to pass between the fixed blade 32 and the movable blade 35 and to extend out from the tape discharge port 3F. As such, the rear end portion of the operation lever 34 is vertically pivoted through the pivotal drive mechanism by the cutting motor 74 driven by a cutting signal, whereby the movable blade 35 is moved close to or approaches the fixed blade 32, and the print tape 23 is cut by the two blades 32 and 35.

Five types of the print tapes 23 to be fed from individual tape cassettes 3D are prepared for use. The types individually have the tape widths of 40 mm, 50 mm, 55 mm, 60 mm, and 70 mm. To enable detecting the differences in the tape widths of the five types of the print tapes 23, a protrusion piece 24 formed of a combination of the presence and absence of four protrusion tabs is provided on a bottom wall portion of each of the tape cassettes 3D. A cassette sensor 68 (see FIG. 4) for detecting the tape width from the combination of the four protrusion tabs of the protrusion piece 24 is mounted on a bottom wall portion of the main frame that supports the lower portion of the tape cassette 3D. More specifically, in accordance with the combination of the four protrusion tabs constituting the protrusion piece 24, the cassette sensor 68 outputs a different cassette signal depending on the tape width. For example, a "0100" cassette signal is output when the tape width is 70 mm, a "1100" cassette signal is output when the tape width is 60 mm, and a "0000" cassette signal is output when no tape cassette 3D is installed.

The circuit configuration of the computer equipment 2 of the label creating apparatus 1 will now be described below with reference to FIG. 3.

Figure 3:
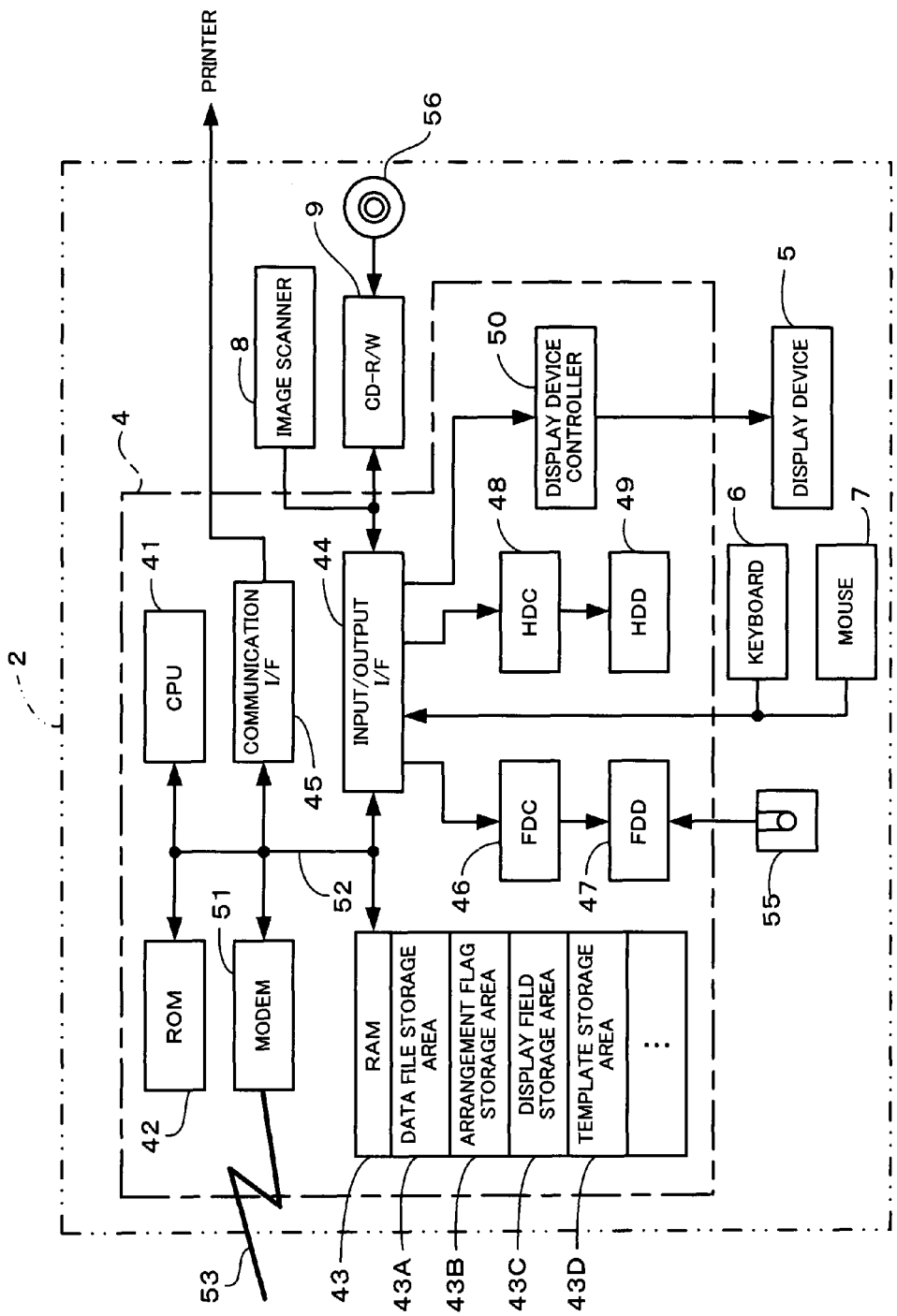
FIG. 3 is a circuit block diagram showing a circuit structure of an essential part of a computer equipment constituting the label creating apparatus according to the present embodiment.

Referring to FIG. 3, the host controller 4 of the computer equipment 2 has a CPU 41, a ROM 42, a RAM 43, an input/output interface (I/F) 44, a communication interface (I/F) 45, a Floppy™ disc controller (FDC) 46, a Floppy™ disc drive (FDD) 47, a hard disc controller (HDC) 48, a hard disc drive (HDD) 49, a display controller 50, a modem 51, and the like. The CPU 41, the ROM 42, the RAM 43, the input/output I/F 44, the communication I/F 45 and the modem 51 are interconnected through a bus line 52, whereby intercommunication of data is performed. To the input/output I/F 44, the FDD 47 and the HDD 49 are connected through the FDC 46 controlling the FDD 47 and through the HDC 48 controlling the HDD 49 respectively. The display controller 50 is also connected to the input/output I/F 44. A telephone line 53 is connected to the modem 51.

The keyboard 6, the mouse 7, the image scanner 8 and the CD-RW drive 9 are connected to the host controller 4. The keyboard 6 is used for entering characters and symbols through the input/output I/F 44. The mouse 7 is used for inputting a coordinate on the display screen of the display 5. The image scanner 8 is used for capturing visible outline data and the like from drawings. The CD-RW drive 9 is for writing into and reading from a CD-ROM 56, printing data and a print control program which will be described later, and the like. Also, the display 5 is connected to the host controller 4. The display 5 displays through the display controller 50 the print tape (see FIG. 11) and the like in which label data is laid out as described later. Further, the tape printer 3 is connected to the host controller 4, through the communication I/F 45 and the signal cable K1.

The CPU 41 controls the whole label creating apparatus 1, and manages the all data on the operation of the label creating apparatus 1. The ROM 42 stores a startup program for booting the computer equipment 2 at power-on, which is in common with general personal computers.

The RAM 43 temporarily stores different types of data when the CPU 41 performs various kinds of control. The RAM 43 has a model data file storage area 43A, an arrangement flag storage area 43B, a display field storage area 43C, and a template storage area 43D, and so on. The model data storage area 43A stores plural label data constituting a data file selected from a database as mentioned later, the label data being stored as a model data file arranged on fields in the predetermined matrix form. The arrangement flat storage area 43B stores an arrangement flag representing whether the tape display area for displaying the tape and the data file display area for displaying the plural label data of the data file in the predetermined matrix are arranged on the display screen of the display device 5 in its upper and lower portions vertically divided or in its left and right portions laterally divided. The display field storage area 43C stores the display field set by a field change processing which will be mentioned later. The template storage area 43D stores a plurality of template data in which a plurality of print-area frames has been allocated in advance according to the print area of the print tape 23.

Further, the RAM 43 comprises various types of memories such as a text memory and a display memory.

The communication I/F 45 is composed of, for instance, a Centronics interface and others, which allows interactive data communications with the tape printer 3 and an external electronic equipment (such as a computer and a laser printer).

The hard disc mounted on the HDD 49 stores an operating system (OS) of various kinds such as MS-DOS™ and Windows™ systems. In addition, the hard disc also stores communication protocols for data communications with the tape printer 3 and the external electronic equipment, application programs such as a word processing software executable in the OS and a data creating software for printing as required, and further a control program for a print data creating and editing processing which will be mentioned later. The hard disc further stores by reading the database from an optical disc 56, the database comprising a plurality of data files each including plural kinds of label data, and also a plurality of template data in which a plurality of print-area frames has been allocated in advance according to the print area of the print tape 23.

A Floppy™ disc (FD) 55 to be removably inserted in the FDD 47 stores a variety of data obtained by the print data creating and editing processing, which will be described later.

An optical disc (CD-ROM) 56 to be removably inserted in the CD-RW drive 9 stores control programs for the print data creating and editing processing described later, the database in which the plurality of data files each including the plural kinds of label data, and the various templates in which a plurality of print-area frames are previously allocated in advance according to the print area of the print tape 23, which will be send to various label creating apparatuses.

Figure 4:
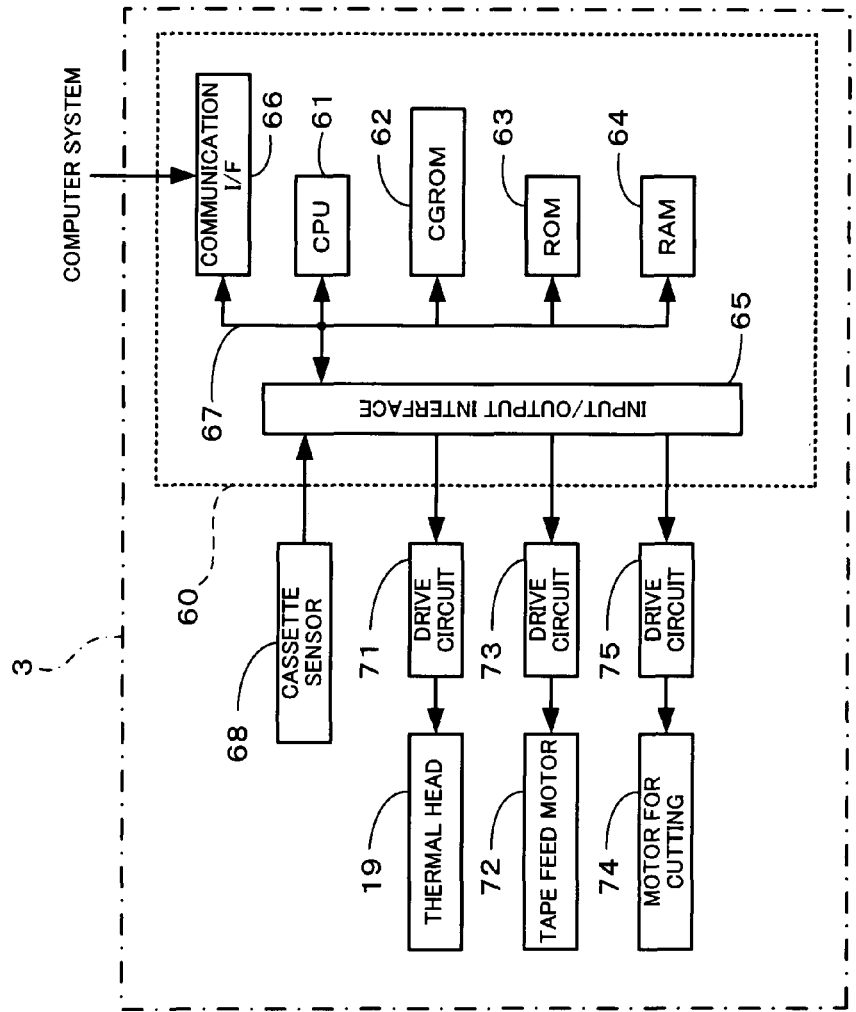
FIG. 4 is a circuit block diagram showing a circuit structure of an essential part of the tape printer constituting the label creating apparatus according to the present embodiment.

The circuit configuration of the tape printer 3 of the label creating apparatus 1 will now be described below with reference to FIG. 4. FIG. 4 is a circuit block diagram showing a circuit structure of an essential part of the tape printer 3 constituting the label creating apparatus 1 according to the present embodiment.

As shown in FIG. 4, a control circuit 60 of the tape printer 3 has a CPU 61, a character generator ROM 62 ("CGROM"), a ROM 63, a RAM 64, an input/output interface ("I/F") 65, a communication I/F 66 and the like, which are interconnected through a bus line 67, whereby intercommunication of data is performed.

Dot pattern data corresponding to individual characters are stored in the CGROM 62. The ROM 63 stores various types of computer programs, such as a print control program required to control the tape printer 3, which will be described later. The CPU 61 executes various operations in accordance with the individual programs stored in the ROM 63. The ROM 63 stores outline data related to individual large numbers of characters for defining outlines of the characters. The characters of the outline data are classified in units of a typeface (Gothic typeface, Mincho typeface, or the like), in correlation to code data. The dot pattern data is extracted to an image buffer in accordance with the outline data.

The RAM 64 temporarily stores various results of operations performed by the CPU 61. The RAM 64 also temporarily stores the print data when printing is performed on the laminated tape 11 by the thermal head 19. In the RAM 64, a text memory, the image buffer and a print buffer are provided.

To the input/output I/F 65, a cassette sensor 68, drive circuits 71, 73, and 75 are connected respectively. The drive circuit 71 is used for driving the thermal head 19. The drive circuit 73 is used for driving the tape feed motor 72. The drive circuit 75 is used for driving the cutting motor 74.

The communication I/F 66 is composed of, for instance, a Centronics interface and the like, which allows the interactive data communications with the computer equipment 2.

Next, an example of the model data file to be stored in the model data file storage area 43A of the RAM 43 of the host controller 4 will be described referring to FIG. 5. In this context, in this model data file, plural kinds of label data which constitute the data file selected from a database are stored in a state of being arranged on the fields in the predetermined matrix form.

Figure 5:
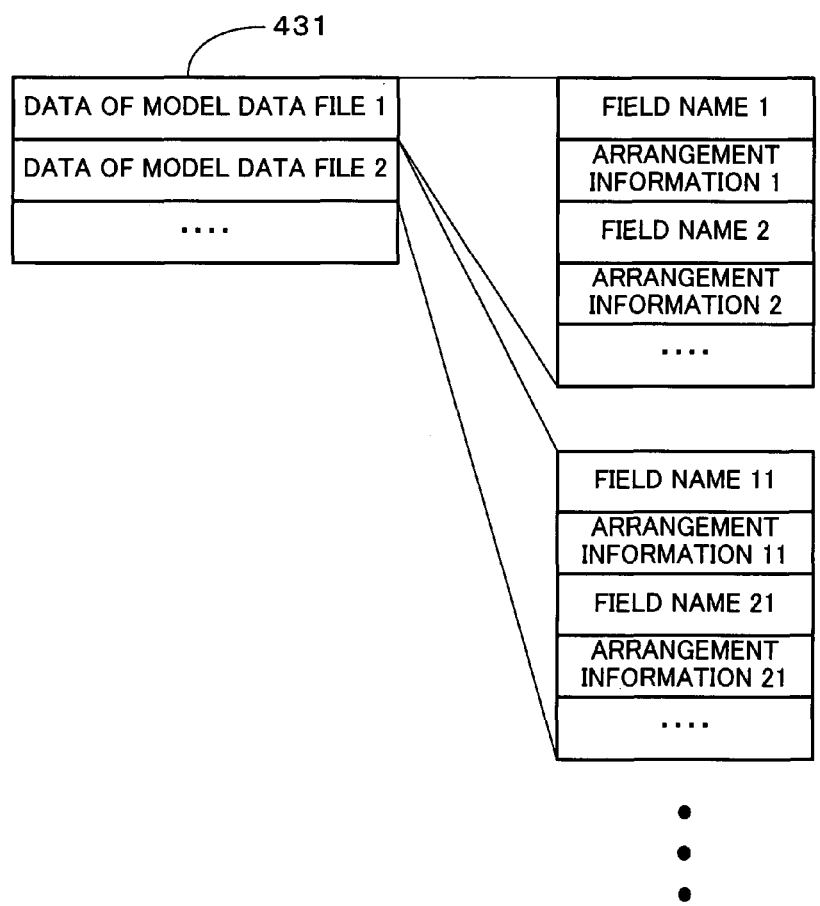
FIG. 5 is a diagram showing an exemplary model data file to be stored in a model data file storage area of a RAM of a host controller constituting the label creating apparatus according to the present embodiment.

As shown in FIG. 5, data 431 of a model data file to be stored in a model data file storage area 43A are plural kinds of label data which constitute the data file selected from the database and the like as described later. The data 431 are stored in a state of being arranged on the fields in the predetermined matrix form in the state where the data 431 are assigned with their respective field names.

For example, among the data 431 in the model data file to be stored in the model data file storage area 43A, "information of a model data file 1" is composed of "field name 1", "field name 2", . . . indicative of the kind of label data, and "arrangement information 1", "arrangement information 2", . . . each storing character data and figure data of each kind of label data assigned with a predetermined order. Further, the "field name 1", "field name 2", . . . are respectively indicative of the order of arrangement in the row direction, whereas the "arrangement information 1", "arrangement information 2", . . . are respectively indicative of the label data arranged in the column direction.

Further, "information of a model data file 2" is composed of "field name 11", "field name 21", . . . respectively indicative of the kind of the label data, and "arrangement information 11", "arrangement information 21" . . . each storing character data and figure data of each kind of label data assigned with a predetermined order. Further, the "field name 11", "field name 21", . . . are respectively indicative of the order of arrangement in the row direction, whereas the "arrangement information 11", "arrangement information 21", . . . are respectively indicative of the label data arranged in the column direction.

Next, the control processing of print data creating and editing processing such as displaying on the display screen of the display device 5 the model data file in which plural kinds of label data of the selected data file of thus-structured label creating apparatus 1 are arranged in a predetermined matrix, and a model tape in which label data is arranged in the print area of the print tape 23 based on the selected template will be described referring to FIGS. 6 to 16.

Figure 6:
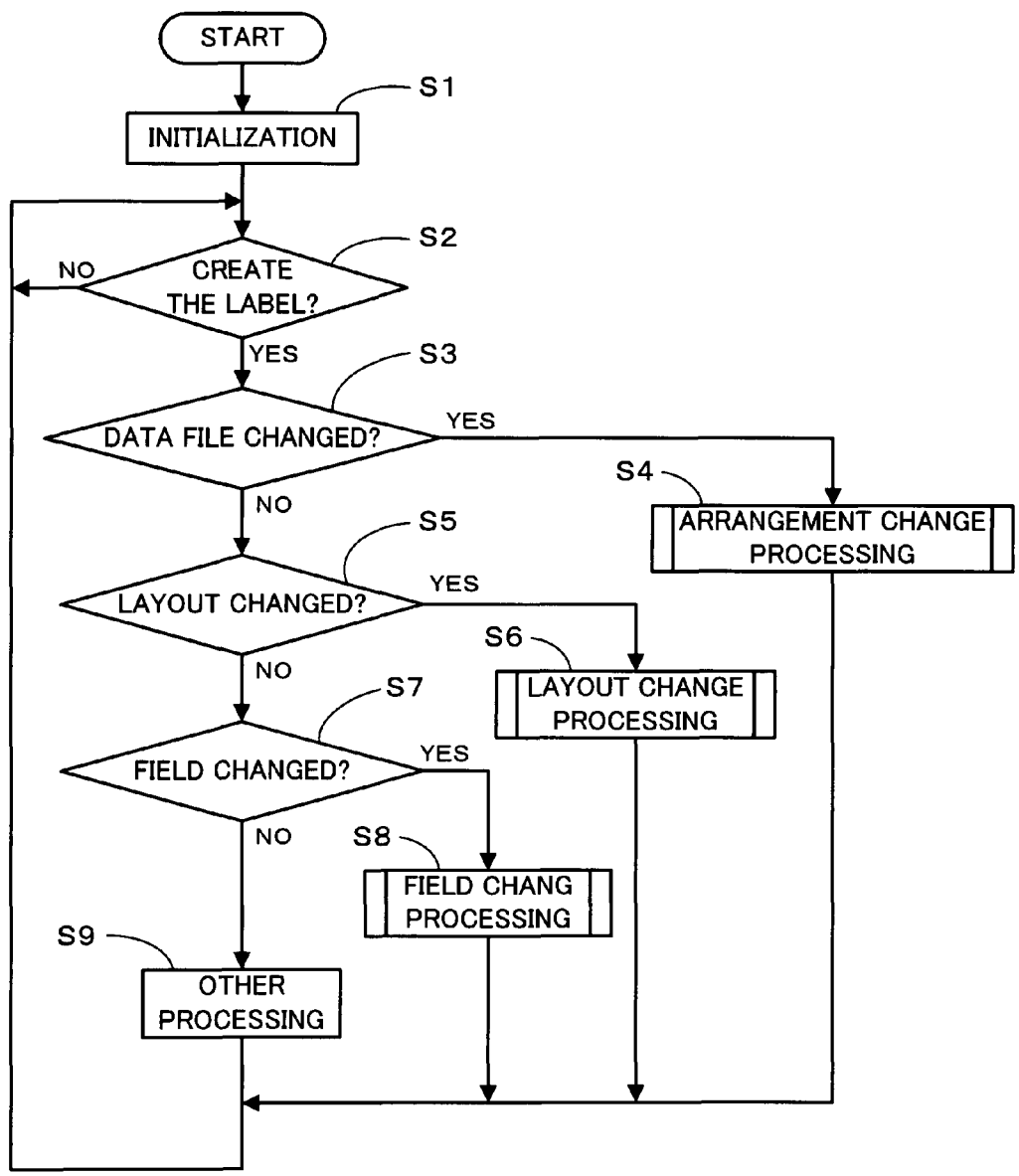
FIG. 6 is a main flowchart showing a control processing of creating and editing print data such as displaying a model data file and a model tape on a display screen of a display device of the label creating apparatus according to the present embodiment.

A shown in FIG. 6, in Step (hereinafter, abbreviated as S) 1, the CPU 41 of the host controller 4 of the label creating apparatus 1 executes initialization of the RAM 43 and the like.

Then, in S2, the CPU 41 waits that a data file is selected via the key board 6 or the mouse 7 and an unillustrated label data creating key on the key board 6 is pressed, or that an unillustrated label data creating button displayed on a display screen of the displaying apparatus 5 is selected and clicked by the mouse 7 (S2: NO). Then, if a data file is selected via the key board 6 or the mouse 7 and then the label data creating key is pressed, or the label data creating button is selected and clicked by the mouse 7 (S2: YES), in S3, the CPU 41 executes a determination processing for determining whether or not an unillustrated data file change key on the key board 6 has been pressed or an unillustrated data file change button displayed on the display screen of the display device 5 has been selected and clicked by the mouse 7.

If the data file change key on the key board 6 has been pressed or the data file change button displayed on the display screen has been selected and clicked by the mouse 7 within a predetermined period of time (S3: YES), in S4, the CPU 41 executes a sub-processing of a later-described "arrangement change processing" for displaying the selected data file entirely on the data file display area. After the execution, the CPU 41 again executes the processing of S2 and thereafter.

On the other hand, if the data file change key on the key board 6 has not been pressed and also the data file change button displayed on the display screen has not been selected and clicked by the mouse 7 within a predetermined period of time (S3: NO), in S5, the CPU 41 executes a determination processing for determining whether or not the layout change button displayed on the display screen of the display device 5 has been selected and clicked by the mouse 7.

If the layout change button has been selected and clicked by the mouse 7 (S5: YES), in S6, the CPU 41 executes a later-described "layout change processing". After the execution, the CPU 41 again executes the processing of S2 and thereafter.

On the other hand, if the layout change button has not been selected and clicked by the mouse 7 (S5: NO), in S7, the CPU 41 executes a determination processing for determining whether or not a field change command for changing the setting of the display field has been issued via the display screen of the display device 5.

If the field change command has been issued via the display screen of the display device 5 (S7: YES), in S8, the CPU 41 executes the later-described "field change processing". After the execution, the CPU 41 again executes the processing of S2 and thereafter.

On the other hand, if the field change command has not been issued via the display screen of the display device 5 (S7: NO), in S9, when an unillustrated print key on the key board 6 is pressed, the CPU 41 executes any other processing such as printing the selected label data in the model data file displayed in the data file display area onto a tape. After the execution, the CPU 41 again executes the processing of S2 and thereafter.

Next, the sub-processing of "arrangement change processing" executed in S4 will be described based on FIGS. 7 and 10 to 12.

Figure 7:
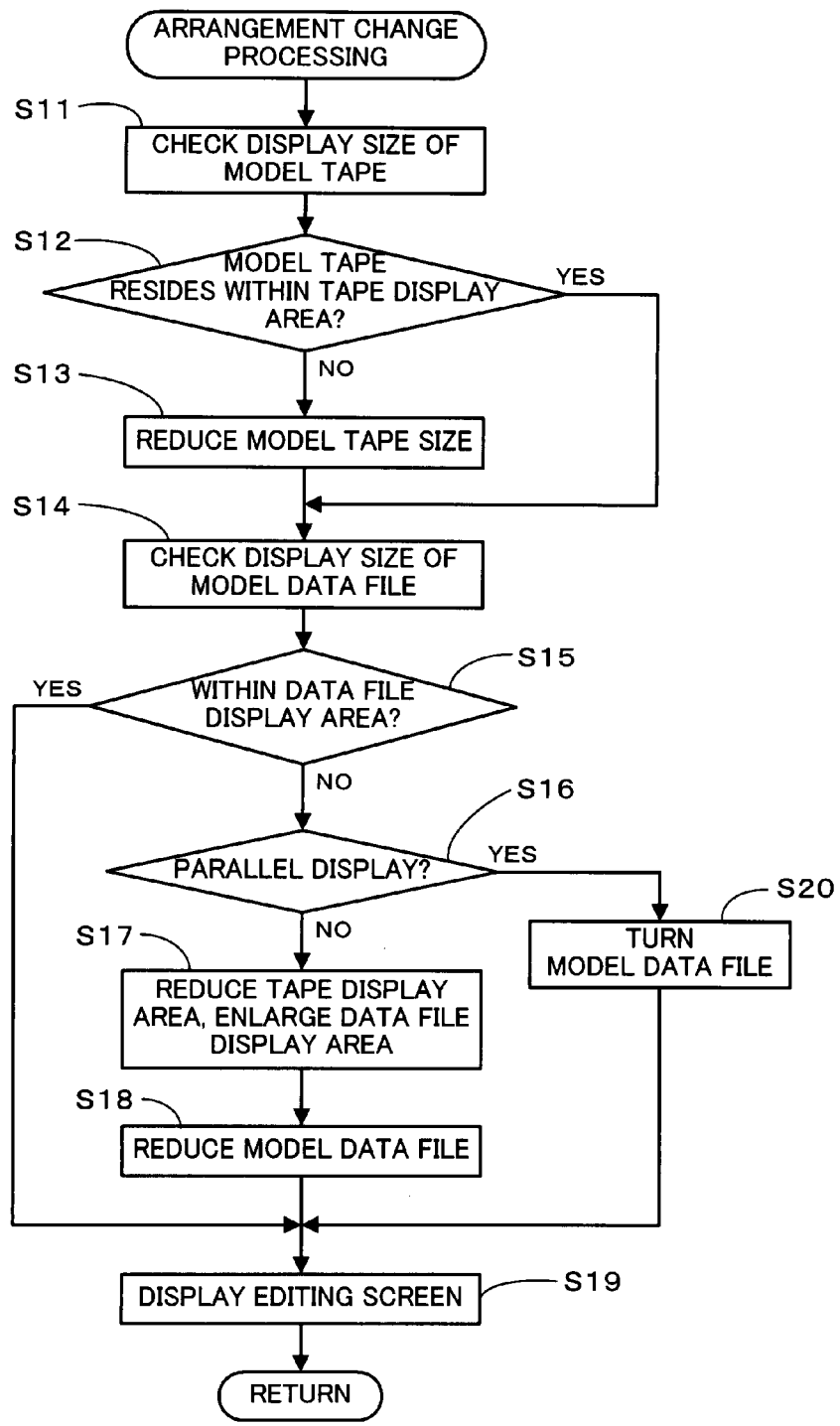
FIG. 7 is a sub-flowchart showing an arrangement change processing to be executed for displaying the model data file of the label creating apparatus according to the present embodiment onto the display screen of the display device.

As shown in FIG. 7, in S11, the CPU 41 divides the display screen of the display device 5 into upper and lower portions where a tape display area is displayed in the upper portion whereas a data file display area is displayed in the lower portion. Then, if a template indicative of a layout of the print area on the print tape 23 is selected, the CPU 41 reads frame information related to this template from the template storage area 43D, and stores in the RAM 43. Then, the CPU 41 creates a model tape in which each frame of the template is arranged in the print area of the print tape 23, and makes display setting such that the model tape in the tape display area is displayed on the display screen of the display device 5. Further, the CPU 41 checks the display size of the model tape which has been set to be displayed on the display screen of the display device 5. That is, the CPU 41 stores the coordinate X1, Y1 on the display screen of the upper end portion at the top end side in the tape width direction of the print area of this model tape, and the coordinate X2, Y2 on the display screen of the lower end portion at the rear end side in the tape width direction in the print area in the RAM 43.

Further, the CPU 41 reads the model data file in which the selected data files are arrange in the predetermined matrix from the model data file storage area 43A, and makes display setting such that the model data file is displayed in the data file display area.

On the upper end portion on the display screen, a parallel display button for instructing to display the model data file in a state of being turned at the lower end portion on the data file display area is provided. Further, on the upper end portion of the display screen, a layout change button for instructing to alternately switch the displayed states between where the tape display area and the data file display area divided into upper and lower portions and where they are divided into left and right portions is provided.

Figure 10:
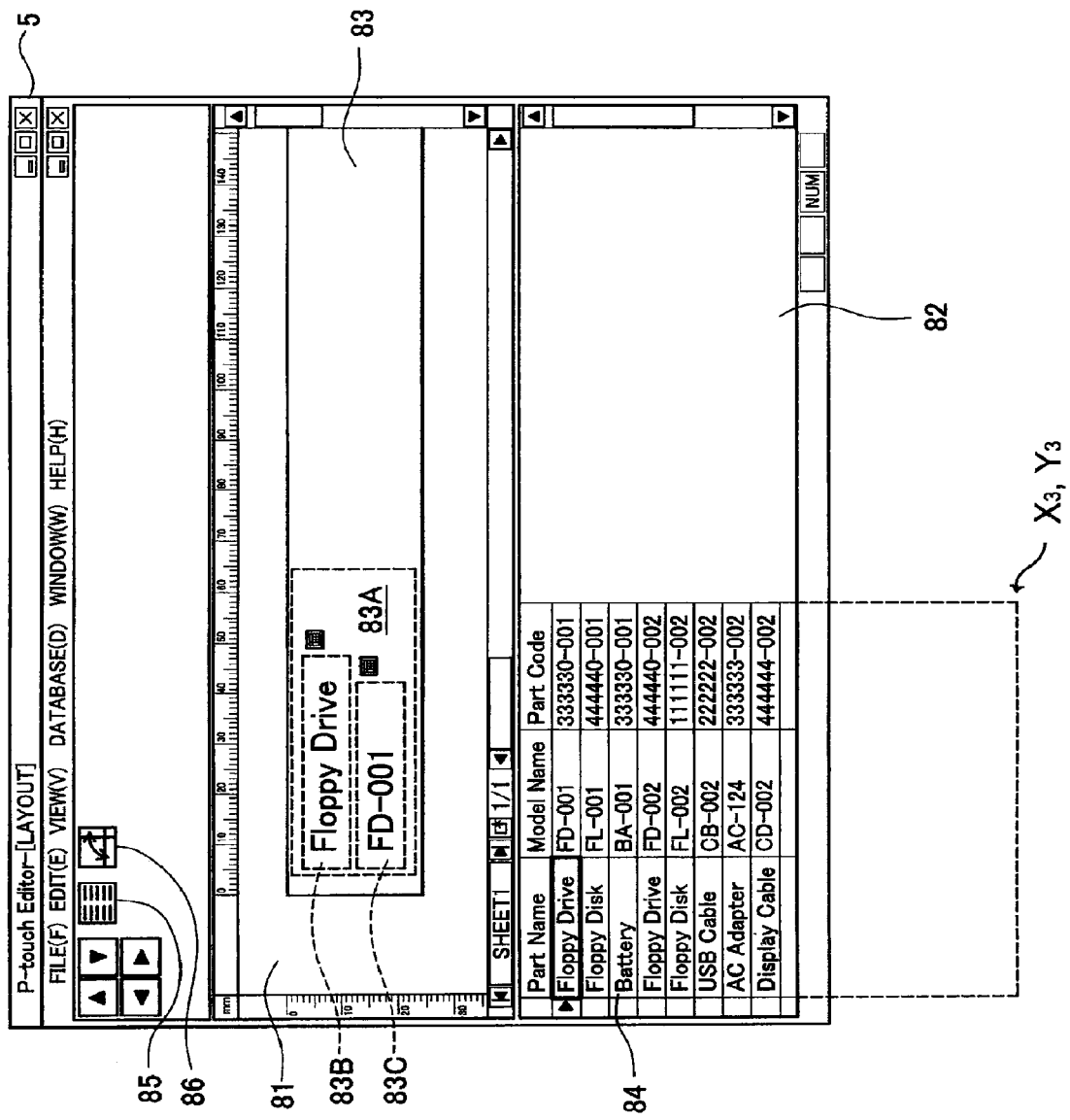
FIG. 10 is a diagram showing an exemplary state where a model data file of the label creating apparatus according to the present embodiment before being compressed is displayed on a data file display area.

For example, as shown in FIG. 10, the display screen of the display device 5 is divided into upper and lower portions where a tape display area 81 is displayed on the upper portion whereas a data file display area 82 is displayed on the lower portion. Then, the CPU 41 makes display setting such that the upper tape display area 81 displays a model tape 83 indicative of frame information on which a template showing the assignment of the label data in the print area of the print tape 23 is arranged. That is, two frames 83B, 83C each in the shape of horizontally elongated rectangle arranged in the tape width direction of the print area 83A of the model tape 83 are displayed. Further, the CPU 41 makes display setting such that the selected label data "Floppy™ Drive" is displayed in the frame 83B. Further, the CPU 41 makes display setting such that the selected label data "FD-001" is displayed in the frame 83C. Further, the CPU 41 stores the coordinate X1, Y1 of the upper end portion at the top end side in the tape width direction of the print area 83A, and the coordinate X2, Y2 of the lower end portion at the rear end side in the tape width direction of the print area 83A in the RAM 43.

Further, the CPU 41 makes display setting such that a model data file 84 is displayed in the data file display area 82 located at the lower side. This model data file 84 is arranged in a matrix form with three columns, wherein in the first row, a first field name to a third field name respectively corresponding to the kinds of the label data are arranged. That is, "Part Name" is arranged in the first field name, "Model Name" is arranged in the second field name, and "Part Code" is arranged in the third field name, respectively. Below the respective first to the third field names, the respective label data in a combination in the order of their respective field names is arranged in the order of the column direction.

Further, on the upper end portion of the display screen, a parallel display button 85 is provided for instructing to display the model data file 84 in the state of being repeatedly turned at the lower end portion of the data file display area 82. Further, on the upper end portion of the display screen, a layout change button 86 for instructing to alternately switch between the displayed states where the tape display area 81 and the data file display area 82 are displayed into upper and lower portions, respectively and where they are divided into left and right portions is provided.

In S12, the CPU 41 executes a determination processing for determining whether or not the model tape displayed in the tape display area resides within the tape display area. That is, the CPU 41 executes a determination processing for determining whether or not the coordinate X2, Y2 on the display screen of the lower end portion at the rear end side in the tape width direction in the print area is present within the tape display area. If this model tape does not reside within the tape display area (S12: NO), in S13, the CPU 41 makes display setting such that the model tape is displayed with its display scale reduced (for example, reduced into 40% to 60%) so that the model tape is displayed within the tape display area.

On the other hand, if this model tape resides within the tape display area (S12: YES), the CPU 41 makes display setting such that the model tape is displayed in the tape display area with its display scale unchanged.

For example, as shown in FIG. 10, if the model tape 83 is displayed within the tape display area 81 (S12: YES), the CPU 41 makes display setting such that the model tape 83 is displayed in the tape display area 81 with its display scale unchanged.

Subsequently, in S14, the CPU 41 checks the display size of the model data file which has been set to be displayed in the data file display area. That is, the CPU 41 stores the coordinate X3, Y3 on the display screen of the right end portion at the lower end side in the column direction of the model data file in the RAM 43.

Then, in S15, the CPU 41 executes a determination processing for determining whether or not the model data file set to be displayed in the data file display area resides within the data file display area. That is, the CPU 41 executes a determination processing for determining whether or not the coordinate X3, Y3 on the display screen of the right end portion at the lower end side in the column direction of the model data file resides within the data file display area.

If the model data file does not reside in the data file display area (S15: NO), in S16, the CPU 41 executes a determination processing for determining whether or not the parallel display button has been selected and clicked by the mouse 7 within a predetermined period of time (for example, in a range of 3 to 5 seconds. If the parallel display button has not been selected and clicked by the mouse 7 within a predetermined period of time (S16: NO), in S17, the CPU 41 displays the tape display area by compressing it in the vertical direction of the screen or in the lateral direction of the screen to the extent that each frame display of the model tape is visible (for example, by compressing the tape display area into 40% to 60%). At the same time, the CPU 41 makes display setting such that the data file display area is displayed in a state of being expanded in the vertical direction of the screen or in the lateral direction of the screen accordingly.

Subsequently, in S18, the CPU 41 makes display setting such that the display scale of the model data file is reduced in such a manner that the coordinate X3, Y3 on the display screen of the right end portion at the lower end side in the column direction of the model data file is displayed on the lower edge portion or the right edge portion of the data file display area, so that the model data file is entirely displayed into the data file display area. In this manner, the model data file is displayed in the data file display area enlarged at a predetermined ratio, whereby each label data is easier to be seen and each label data can be speedily selectable.

Figure 11:
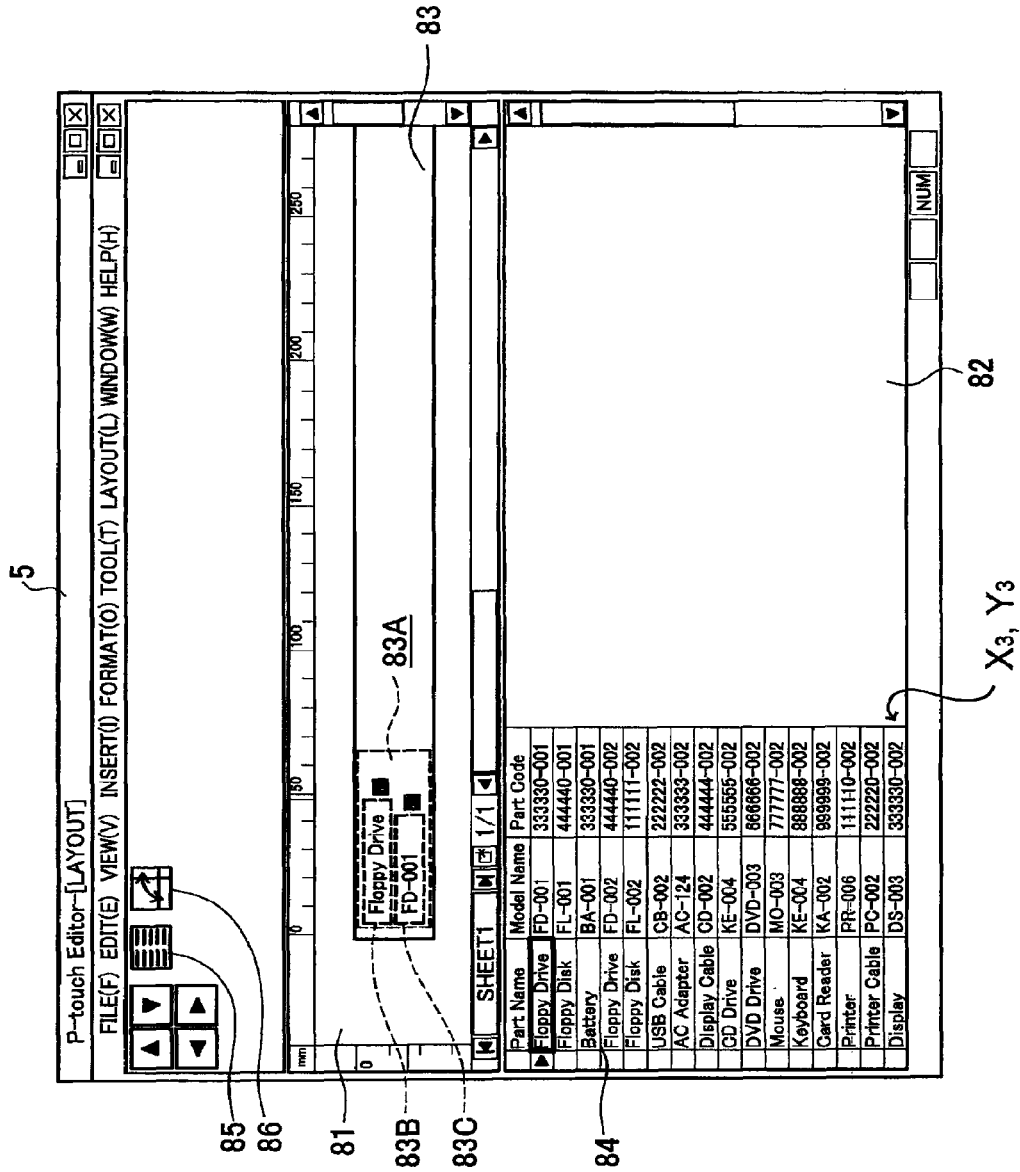
FIG. 11 is a diagram showing an exemplary state where a model data file of the label creating apparatus according to the present embodiment is compressed and is entirely displayed on the data file display area.

For example, as shown in FIG. 10, if it is impossible to display the entire model data file 84 into the data file area 82, that is, if the coordinate X3, Y3 on the display screen of the right end portion at the lower end side in the column direction of the model data file 84 resides outside the data file display area 82, as shown in FIG. 11, the CPU 41 compresses the tape display area 81 in the vertical direction of the screen by about 57%, and accordingly, expands the data file display area 82 in the vertical direction of the screen. At the same time, the CPU 41 makes display setting such that the coordinate X3, Y3 on the display screen at the right end portion at the lower end side in the column direction of the model data file 84 is displayed in the lower edge portion of the expanded data file display area 82.

Then, in S19, after the display setting as described above, the CPU 41 displays the tape display area, data file display area, model tape and model data file onto the editing screen of the display device 5. Then, the CPU 41 terminates this sub-processing and returns to the main flowchart.

For example, as shown in FIG. 11, the CPU 41 executes displays the tape display area 81 compressed into about 57% on the upper side of the editing screen of the display device 5 and displays the model tape 83 thereon. Further, the CPU 41 displays the respective frames 83B, 83C in the print area 83A of the model tape 83. In addition, the CPU 41 executes control to display the data file display area 82 enlarged in the vertical direction onto the lower side of this editing screen, and displays the model data file 84 so that the entire model data file 84 is included within the vertical width of this data file display area 82.

On the other hand, in S16, if the parallel display button is selected and clicked by the mouse 7 within a predetermined period of time (S16: YES), in S20, the CPU 41 makes display setting such that the model data file is displayed in a state of being repeatedly turned at the lower end portion of the data file display area.

Then, in S19, after the display setting as described above, the CPU 41 displays the tape display area, data file display area, model tape and model data file onto the editing screen of the display device 5. After that, the CPU 41 terminates this sub-processing and returns to the main flowchart.

Figure 12:
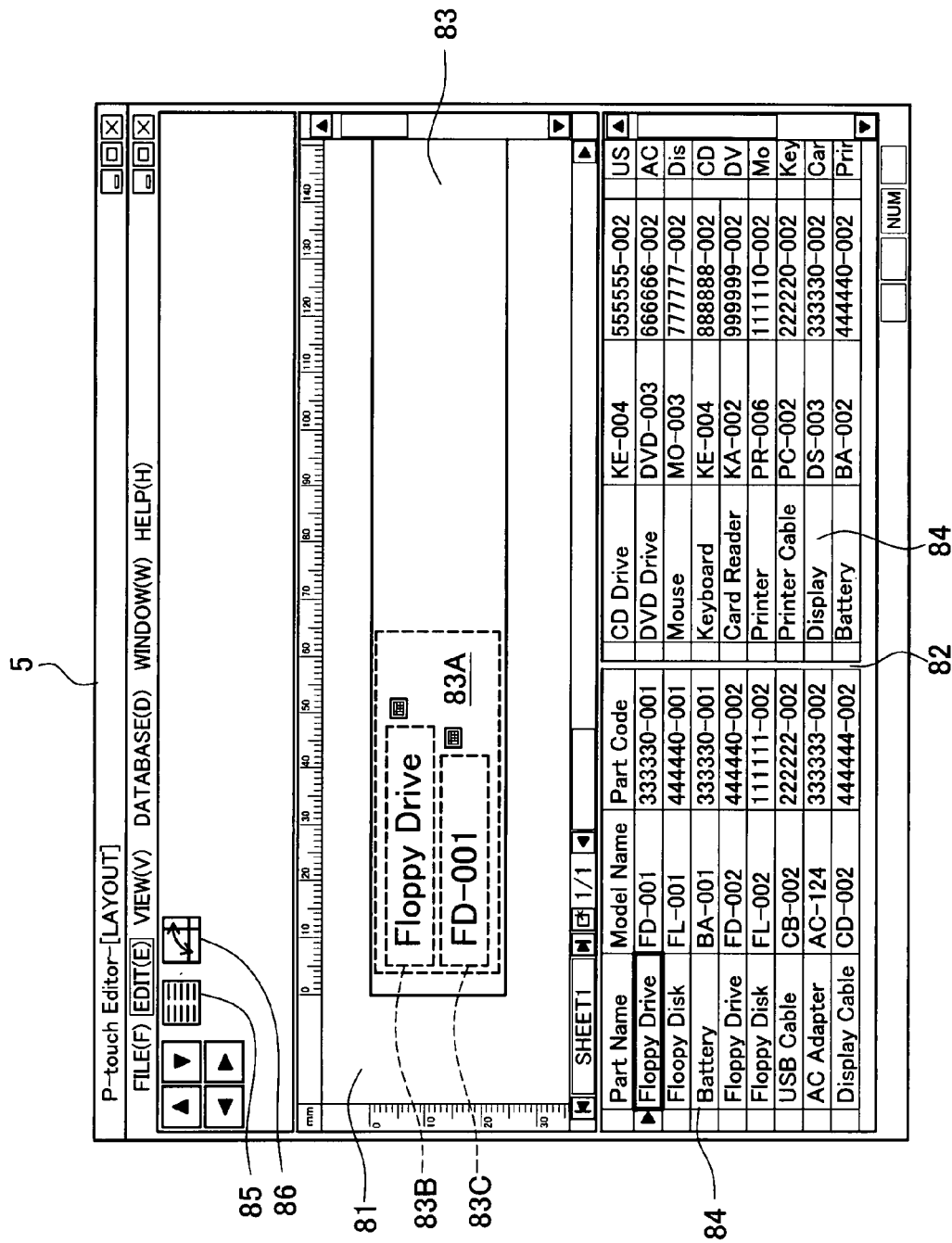
FIG. 12 is a diagram showing an exemplary state where a model data file of the label creating apparatus according to the present embodiment is repeatedly turned and entirely displayed on the data file display area.

For example, as shown in FIG. 10, if it is impossible to display the entire model data file 84 onto the data file display area 82, that is, if the coordinate X3, Y3 on the display screen of the right end portion at the lower end side in the column direction of the model data file 84 resides outside the data file display area 82 and the parallel display button 85 is selected and clicked by the mouse 7 within a predetermined period of time (for example, about 3 to 5 seconds), as shown in FIG. 12, the CPU 41 repeatedly turns the model data file 84 at the lower end portion of the data file display area 82, so as to display the entire model data file 84 onto the data file display area 82.

On the other hand, in S15, if the model data file resides in the data file display area (S15: YES), in S19, after the display setting as described above, the CPU 41 displays the tape display area, the data file display area, the model tape and the model data file onto the editing screen of the display device 5. After that, the CPU 41 terminates this sub-processing and returns to the main flowchart.

Next, a sub-processing of "layout change processing" to be executed in S6 will be described based on FIGS. 8, 11, and 13.

Figure 8:
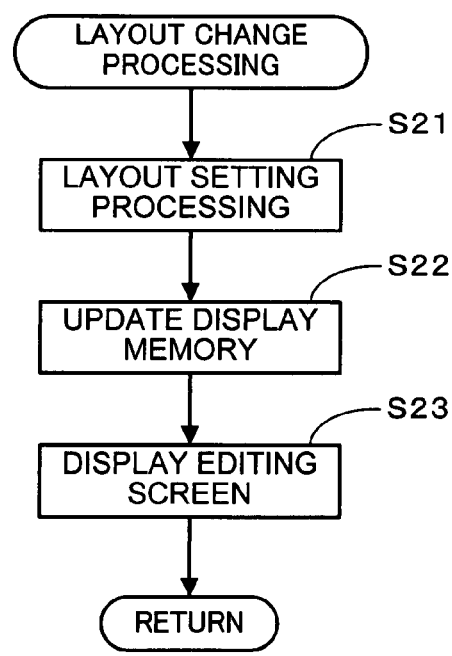
FIG. 8 is a sub-flowchart showing a layout change processing to be executed for changing the layout related to the display screen of the display device of the label creating apparatus according to the present embodiment.

As shown in FIG. 8, if the layout change button displayed on the display screen of the display device 5 is selected and clicked by the mouse 7 (S5: YES), in S21, the CPU 41 reads from an arrangement flag storage area 43B the arrangement flag indicative of whether the tape display area and the data file display are displayed on the display screen of the display device 5 in its upper and lower portions vertically divided respectively or in its left and right portions laterally divided respectively. If the arrangement flag read from the arrangement flag storage area 43B is "0", the CPU 41 determines that the tape display area and the data file display area are displayed on the display screen in its upper and lower portions vertically divided. Then, the CPU 41 makes display setting such that this tape display area and the data file display area are displayed on the display screen in a state of being divided into the left and right portions of the display screen. Further, CPU 41 substitutes "1" into this arrangement flag, and again stores in the arrangement flag storage area 43B.

On the other hand, if the arrangement flag read from the arrangement flag storage area 43B is "1", the CPU 41 determines that the tape display area and the data file display area are displayed in the left and right portions on the display screen laterally divided. In this case, the CPU 41 makes display setting such that this tape display area and this data file display area are displayed in the upper and lower portions on the display screen vertically divided. Further, the CPU 41 substitutes "0" into this arrangement flag, and again stores in the arrangement flag storage area 43B.

Then, in S22, the CPU 41 updates a display memory to display the tape display area and the data file display area in a manner divided based on the display setting set in S21.

Subsequently, in S23, the CPU 41 displays on the display device 5 the editing screen where the tape display area and the data file display area are displayed in the upper and lower portions vertically divided has been changed into the editing screen where the tape display area and the data file display area are displayed in the left and right portions laterally divided, or alternatively, the editing screen where the tape display area and the data file display area are displayed in the left and right portions laterally divided has been changed into the editing screen where the tape display area and the data file display area are displayed in the upper and lower portions vertically divided. After that, the CPU 41 terminates this sub-processing and returns to the main flowchart.

For example, as shown in FIG. 11, the CPU 41 displays the model tape 83 with the tape display area 81 displayed on the upper side of the editing screen of the display device 5. Further, the CPU 41 displays the data file display area 82 on the lower side of the editing screen so that the entire model data file 84 falls within the vertical width of this data file display area 82. Further, the layout change button 86 is displayed on the upper end portion of the display screen.

Figure 13:
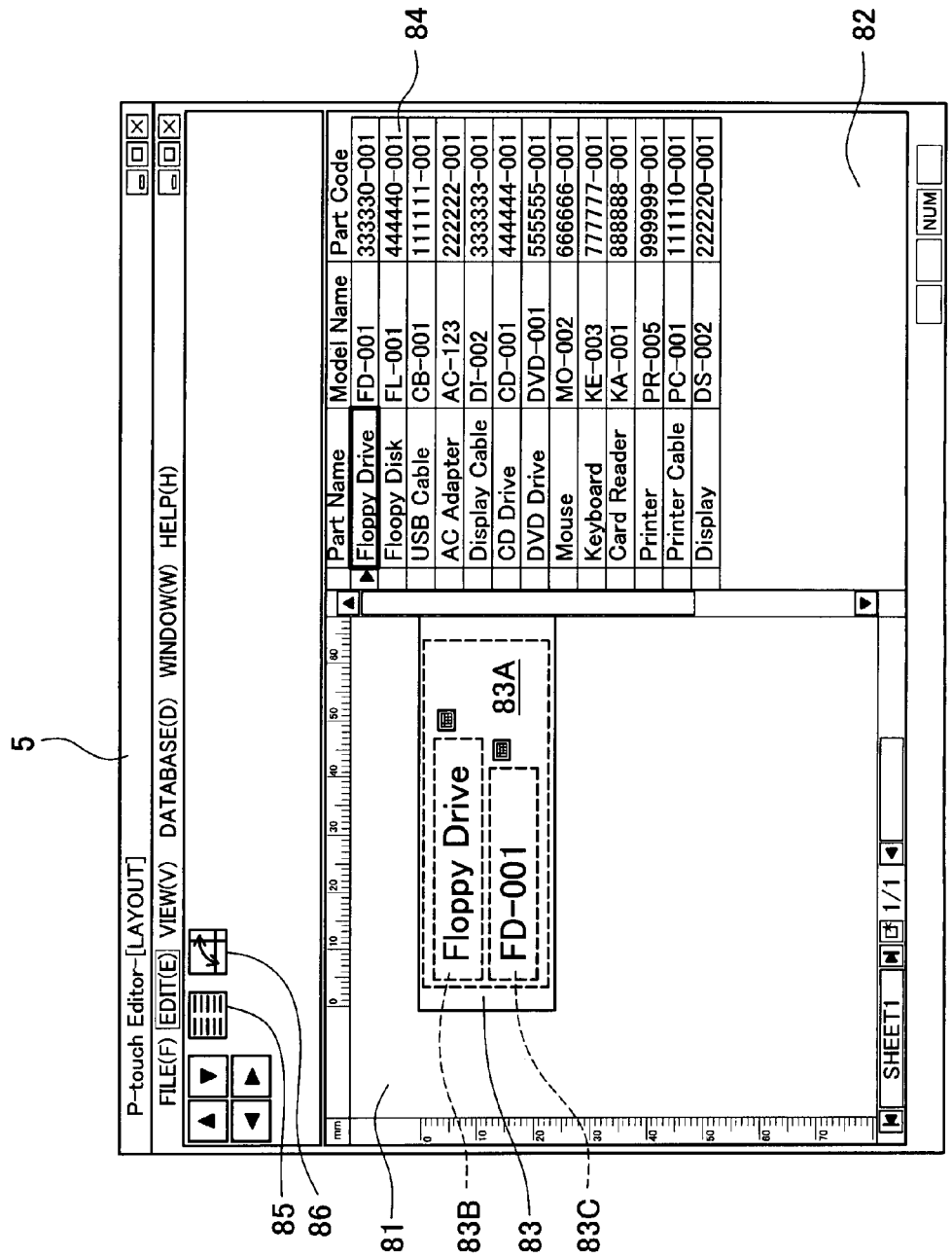
FIG. 13 is a diagram showing an exemplary state where a layout of the display screen of the display device of the label creating apparatus according to the present embodiment is changed.

In this case, if the layout change button 86 is selected and clicked by the mouse 7, as shown in FIG. 13, the CPU 41 divides the display screen of the display device 5 into left and right portions, and displays the tape display area 81 in the left portion and displays the model tape 83 in its original size therein (see FIG. 10). Further, the CPU 41 displays the data file display area 82 in the right portion and displays the model data file 84 therein. Further, the layout change button 86 is displayed on the upper end portion of the display screen.

Incidentally, as shown in FIG. 13, if the layout change button 86 is again selected and clicked by the mouse 7 in the state where the tape display area 81 and the data file display area 82 are displayed in a state of being arranged in the left and right portions respectively, as shown in FIG. 11, the tape display area 81 and the data file display area 82 are displayed in a state where they are arranged in the upper and lower divided portions.

Next, a sub-processing of "field change processing" to be executed in S8 will be described based on FIGS. 9, 11, and 14 to 16.

Figure 9:
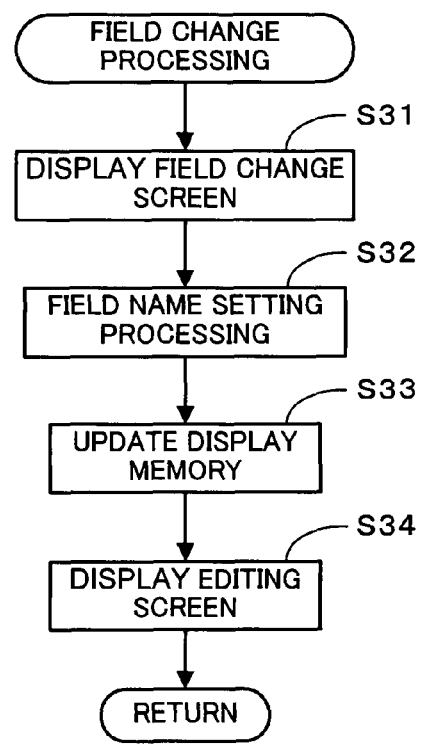
FIG. 9 is a sub-flowchart showing a field change processing to be executed for setting a field name of a model data file displayed on the display screen of the display device of the label creating apparatus according to the present embodiment.

As shown in FIG. 9, if the field change command is issued via the display screen of the display device 5 (S7: YES), in S31, the CPU 41 displays a field change screen on the display screen of the display device 5.

In this context, this field is expressed in the field name corresponding to the kind of each label data arranged in the row direction of the model data file. Therefore, a model element data file indicative of a state where element data including a combination of data in the name of the fields each corresponding to the combination of each kind of label data arranged in a row direction is arranged in a column direction, that is, a model data file is created. Then, display setting is made so that the model data file is displayed in the data file display area.

For example, as shown in FIG. 11, in a state when the display screen is vertically divided into the upper and lower portions where the data file display area 82 is displayed in the lower portion and the model data file 84 is displayed therein, on the first line of the model data file 84, field names corresponding to the kind of each label data is displayed. As a first field name, "Part Name" is displayed. As a second field name, "Model Name", as a third field name, "Part Code" are displayed. On the second line and thereafter in the model data file 84, element data in which a combination of the label data each corresponding to each field name is arranged in a row direction are displayed in a state of being arranged in a column direction.

Figure 14:
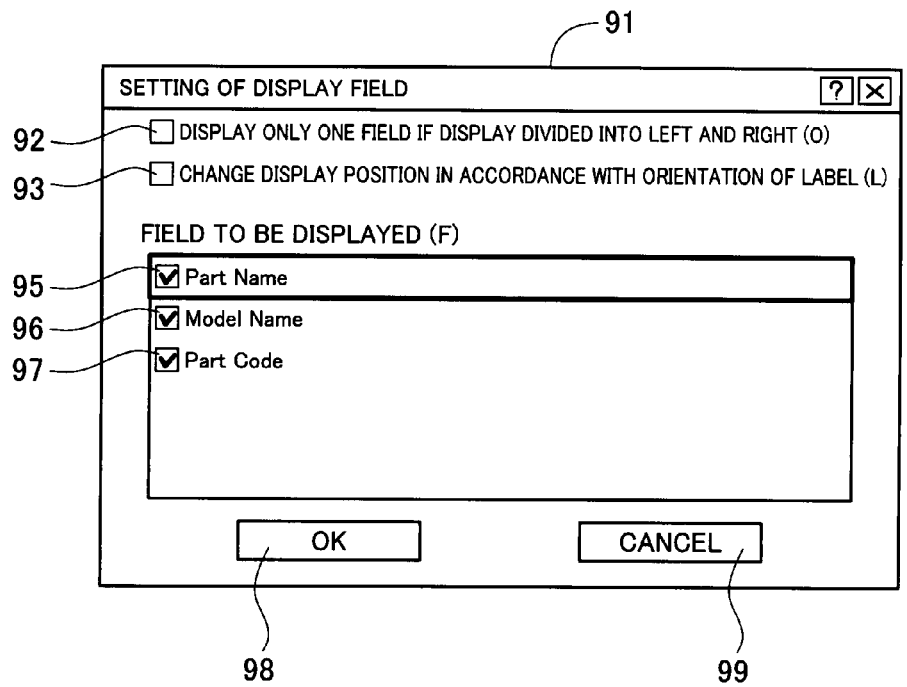
FIG. 14 is a diagram showing an exemplary state before changing the display field changing screen of the display device of the label creating apparatus according to the present embodiment.

Further, as shown in FIG. 14, the field change screen 91 for setting the display field to be displayed in this case displays an indication "DISPLAY ONLY ONE FIELD DIVIDED INTO LEFT AND RIGHT (O)" on the upper end portion, and a rectangular check blank 92 on the left end portion of this indication. This is to instruct to divide the display screen of the display device 5 into left and right portions, and to display the tape display area 81 in the left portion and to display the model tape 83 therein, whereas to display the data file display area 82 in the right portion and to display only the field with the first field name in the model data file 84.

Further, below the above instruction, there is displayed an indication "CHANGE DISPLAY POSITION IN ACCORDANCE WITH ORIENTATION OF LABEL (L)" and a rectangular check blank 93 on the left end portion of this indication. This is to instruct, when the label data is to be printed on the print tape 23 in a state being printed along a horizontal direction, to divide the display screen into upper and lower portions and to display the tape display area 81 and the data file display area 82 in the respective portions, and to display the model tape 83 in a state of being arranged along the lateral direction of this tape display area 81; on the other hand, when the label data is to be printed on the print tape 23 in a state being printed along a vertical direction, to divide the display screen into left and right portions and to display the tape display area 81 and the data file display area 82 in the respective portions, and to display the model tape 83 in a state of being arranged along the vertical direction of this tape display area 81.

Further, at the center of the field change screen 91, an indication "FIELD TO BE DISPLAYED (F)" is displayed, and below this indication, "Part Name" which is the first field name of the model data file 84 is displayed. Further, a rectangular check blank 95 is displayed on the left end portion of this indication, and the rectangular check blank 95 is checked to indicate that the display is now being made as shown in FIG. 11. Further, below this indication, "Model Name" which is the second field name of the model data file 84 is displayed. Further, a rectangular check blank 96 is displayed on the left end portion of this indication, and the rectangular check blank 96 is checked to indicate that the display is now being made as shown in FIG. 11. Further, below this indication, "Part Code" which is the third field name of the model data file 84 is displayed. Further, a rectangular check blank 97 is displayed on the left end portion of this indication, and the rectangular check blank 97 is checked to indicate that the display is now being made as shown in FIG. 11.

Further, on the lower end portion of the field change screen 91, an "OK" button 98 for instructing to terminate an input and a "CANCEL" button 99 for instructing to stop the field change processing are arranged.

Then, in S32, if it is instructed via the field change screen to newly change the combination of the field name of the model data file to be displayed in the data file display area, the CPU 41 makes display setting according to the instruction.

Subsequently, in S33, the CPU 41 changes the setting of each field of the model data file based on this display setting, and updates the display memory so as to display the field in the data file display area. After that, in S34, the CPU 41 displays the changed editing screen onto the display device 5, and then terminates this sub-processing and returns to the main flowchart.

In this manner, by designating the field name of the model data file to be displayed on the data file display area via the field change screen, a second model element data file composed of only the label data of the kind corresponding to this field name is created, that is, a model data file composed of only the label data corresponding to the specified field name is created. Then, thus-created model data file is displayed on the data file display area.

Figure 15:
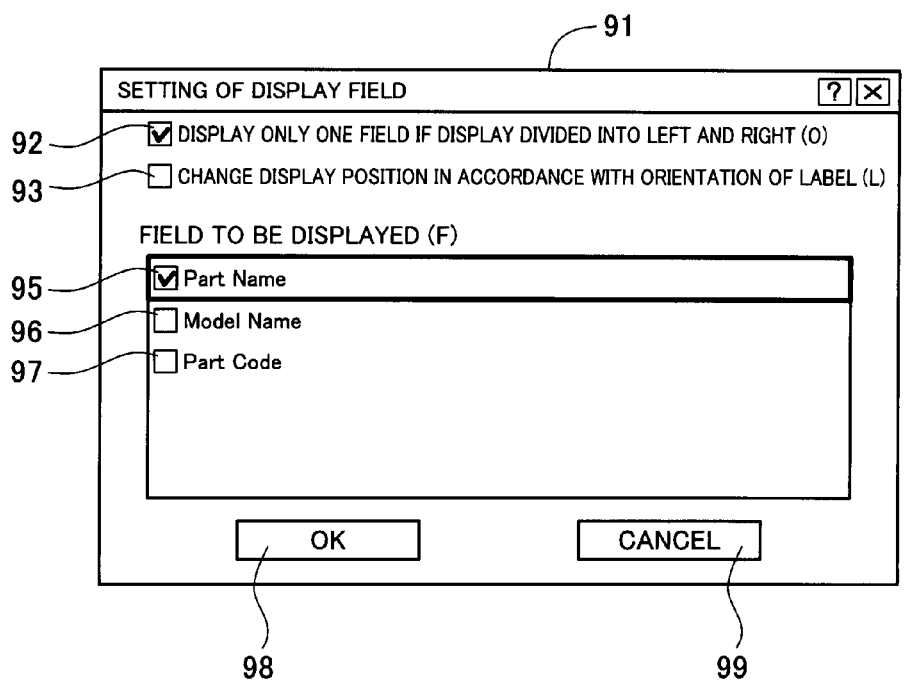
FIG. 15 is a diagram showing an exemplary state after changing the display field changing screen shown in FIG. 14.

For example, as shown FIG. 15, if the check blank 92 is selected and clicked by the mouse 7 with the result that a check mark appears therein, whereas the respective check blanks 96, 97 are selected and clicked by the mouse 7 with the result that a check mark disappear therefrom, that is, if only the respective check blanks 92, 95 are marked with a check mark and the "OK" button 98 is selected and clicked by the mouse 7, the display screen is laterally divided into the left and right portions where the tape display area and the data file display area are displayed in a state of being arranged in the left and right portions. At the same time, the CPU 41 makes display setting such as to display a model data file 88 as a second model element data file composed of only the field assigned with "Part Name" which is the first field name.

Figure 16:
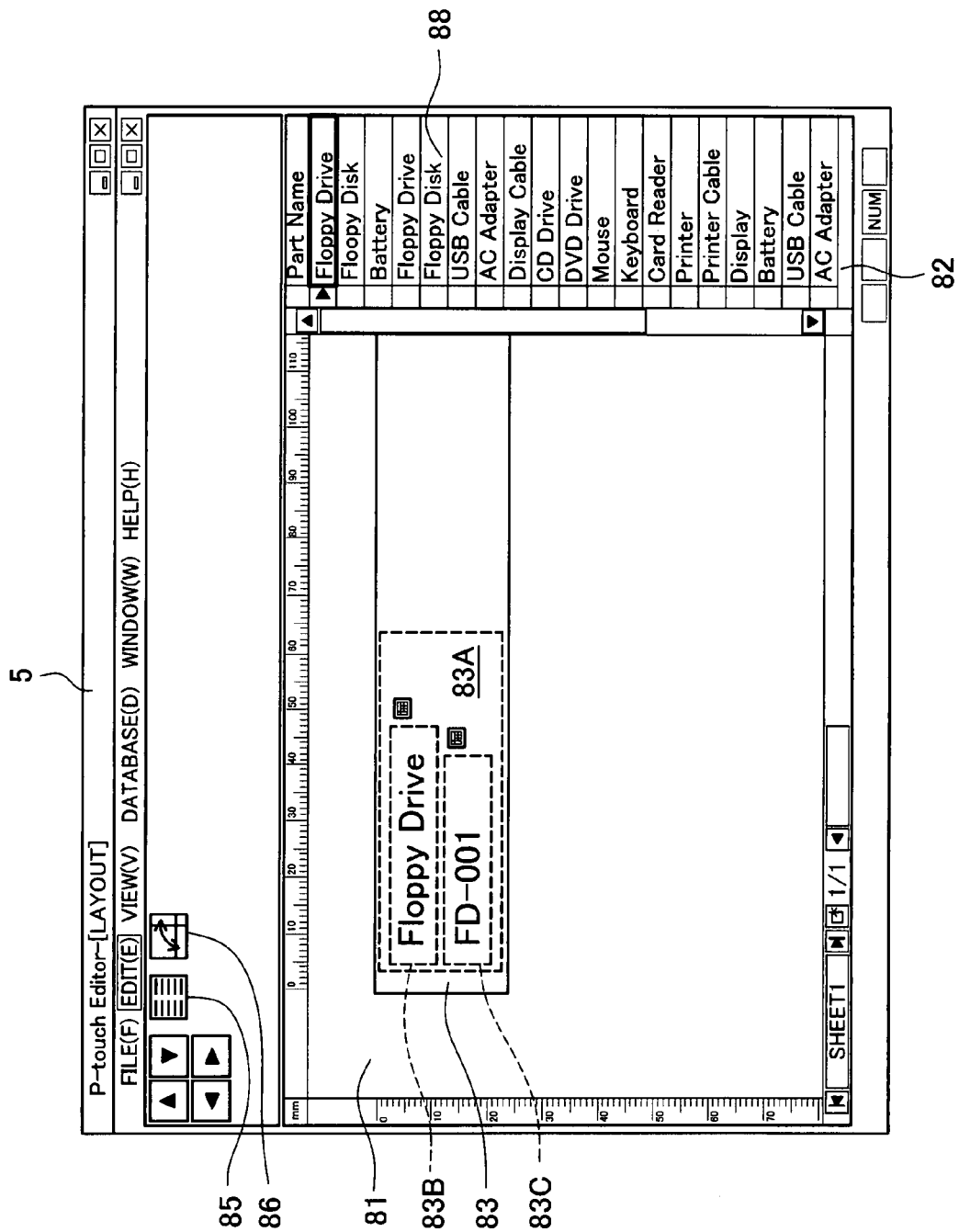
FIG. 16 is a diagram showing an exemplary state where only one field of the model data file is displayed in the case where the display screen of the display device of the label creating apparatus according to the present embodiment is divided into left and right portions.

Then, as shown in FIG. 16, the display screen of the display device 5 is laterally divided into the left and right portions where the tape display area 81 is displayed in a state of being arranged in the left portion and the data file display area 82 is displayed in a state of being arranged in the right portion. Further, in the data file display area 82, the entire model data file 88 composed of only the field assigned with "Part Name" as the first field name is displayed. This data file display area 82 is displayed in a state of being compressed rightward. On the other hand, the tape display area 81 is displayed in a state of being expanded rightward accordingly.

In this context, the host controller 4 serves as a print data creating and editing means. Further, an optical disc 55 and a HDD 49 respectively serve as a storage means. Further, the display device 5 serves as a display means. Further, the display device 5, the mouse 7, and the key board 6 together constitute a print data selecting means. Further, the CPU 41, the ROM 42, and the RAM 43 together constitute a divided display control means, print data creating means, model tape display control means, model data file display control means, file display size determining means, and tape display size determining means. Further, the parallel display button 85 serves as an instructing means. Further, the layout change button 86 serves as a layout change instructing means. Further, the field change screen 91 and the mouse 7 together constitute a field selecting means. Further, the model data file 88 serves as a second model element data file.

As described above, in the label creating apparatus 1 according to this embodiment, if the model data file indicative of a state where a plurality of label data stored in the data file arranged in the predetermined matrix cannot be entirely displayed on the data file display area, the processings of S17 and S18 are executed to compress the tape display area along the vertical direction or lateral direction of the display screen. Thus, the data file display area is expanded in this vertical direction or the lateral direction whereas the model data file is compressed accordingly, so that the model data file can be entirely displayed on the data file display area. As a result, the data file display area is widened, so that the model data file to be displayed in a compressed state in this data file display area can be displayed in a larger size. Thus, the user can easily know the label data stored in the data file, and can quickly select the label data to be printed on the tape 23. At the same time, a problem that a label data is not accidentally selected can be assuredly prevented.

Further, in the case where the model data file cannot be displayed entirely on the data file display area, if the parallel display button is selected and clicked by the mouse 7, the processings of S16 and S20 are executed to display the model data file in a state of being repeatedly turned at the lower end portion of the data file display area for the parallel display. In this manner, it is possible to prevent the character size of the model data file displayed in the data file display area from being compressed, and also to display a larger number of label data on the data file display area. Thus, the user can easily know the label data stored in the data file, and can quickly select the label data to be printed on the tape 23. At the same time, a problem that a label data is not accidentally selected can be assuredly prevented.

Further, if the model tape indicative of the state where print data is printed on the tape 23 cannot be entirely displayed in the tape display area, the processings of S12 and S13 are executed so that the model tape is compressed to be entirely displayed in the tape display area. Thus, the user can assuredly confirm the print layout of the tape 23, thereby achieving this enhanced operability. Further, when the model tape is compressed, the tape display area in which the model tape is displayed can be compressed in a vertical direction or in a lateral direction. Accordingly, the data file display area can be expanded in the vertical direction or in the lateral direction, and thus, the model data file can be enlarged as much as possible to be entirely displayed.

Further, by selecting and clicking the layout change button by the mouse 7, it is possible to alternately switch between the displayed states where the display screen is divided into the upper and lower portions in which the tape display area and the data file display area are displayed respectively, and where the display screen is divided into the left and right portions in which the tape display area and the data file display area are displayed respectively. Thus, either one of the model data file or the model tape can be displayed with preference to the other, thereby achieving this further enhanced operability of creating a label printed with label data.

Further, the user can allow only the label data which he wants to print on the tape 23 to be displayed into the data file display area, thereby achieving this further enhanced operability of creating a label printed with label data. Further, since the number of the kinds of label data displayed in the data file display area is reduced, when the label data is displayed in a state of repeatedly turned, the character size of the label data displayed in the data file display area can be enlarged. As a result, selection of label data can be more easily performed.

The present invention is not limited to the embodiments described above. It is a manner of course that various modifications and variations may be made without departing from the scope of the present invention.

The invention claimed is:

1. A label creating apparatus having a print data creating and editing device that creates and edits print data to be printed onto a long tape, the print data creating and editing device comprising:

a storage device that stores a data file that stores a plurality of label data composed of character data and figure data;

a divided display control device that performs display control to display a display screen of a display device in a state of being divided into a tape display area for displaying the tape and a data file display area for display the data file so that the tape display area and the data file display area are displayed at the same time in the display screen of the display device;

a print data selecting device capable of selecting plural pieces of label data from the data file displayed in the data file display area;

a print data creating device that creates print data to be printed on the tape from the label data selected by the print data selecting device;

a model tape display control device that creates a model tape indicative of a state where the print data is printed on the tape, and displays the model tape in the tape display area;

a model data file display control device that creates a model data file indicative of a state where a plurality of label data stored in the data file are arranged in a predetermined matrix, and displays the plural label data in the data file display area; and a file display size determining device that determines whether or not the model data file is entirely displayed in the data file display area, wherein, if the file display size determining device determines that the model data file is not entirely displayed in the data file display area, the model data file display control device compresses the model data file so that the model data file can be entirely displayed in the data file display area; and wherein said display screen is separate from a label printer for printing the long tape.

2. The label creating apparatus according to claim 1, wherein, if the file display size determining device determines that the model data file is not entirely displayed in the data file display area, the divided display control means device compresses the tape display area in a predetermined direction on the display screen, and at the same time, expands the data file display area in the predetermined direction.

3. The label creating apparatus according to claim 1, wherein the print data creating and editing device comprises an instructing device that instructs to display the model data file in a parallel state by repeatedly turning the model data file at a lower end portion of the data file display area, and if the file display size determining device determines that the model data file cannot be entirely displayed in the data file display area, and if displaying the model data file in the parallel state is instructed via the instructing device, the model data file display control device performs display control to display the model data file in a parallel state by repeatedly turning the model data file at the lower end portion of the data file display area.

4. The label creating apparatus according to claim 1, wherein the print data creating and editing device comprises a tape display size determining device that determines whether or not the model tape is entirely displayed in the tape display area, and if the tape display size determining device determines that the model tape is not entirely displayed in the tape display area, the model tape display control device performs control such that the model tape is compressed to be entirely displayed in the tape display area.

5. The label creating apparatus according to claim 1, wherein the print data creating and editing device comprises a layout change instructing device that instructs to switch a display layout from one to the other between a first divided displayed state where the display screen is vertically divided into upper and lower portions in which the tape display area and the data file display area are displayed respectively, and a second divided displayed state where the display screen is laterally divided into left and right portions in which the tape display area and the data file display area are displayed respectively, and if changing the display layout is instructed via the layout change instructing device, the divided display control device performs display control such that the tape display area and the data file display area are displayed in the other display state.

6. The label creating apparatus according to claim 1, wherein the data file includes an element data file that stores plural pieces of element data composed of a combination of plural kinds of label data, the model data file includes a model element data file indicative of a state where combinations of plural kinds of fields each corresponding to the respective plural kinds of label data are arranged in a row direction of the predetermined matrix, whereas the element data are arranged in a column direction of the predetermined matrix, the print data creating and editing device comprises a field selecting device that selects a field to be displayed in the data file display area from plural kinds of fields in the model element data file, and if a field is selected via the field selecting device, the model data file display control device performs display control such that a second model element data file indicative of a state where only the selected field of the model element data file is arranged in the row direction of the predetermined matrix is created and the second model element data file is displayed in the data file display area.

7. A non-transitory computer readable recording medium comprising:

a computer program product used and executed by a label data creating apparatus, the computer program product comprising:

a data file that stores a plurality of label data composed of character data and figure data, the data file being stored in the non-transitory computer readable recording medium and a computer program stored in the non-transitory computer readable recording medium, wherein the computer program includes a divided display controlling step of performing display control to display a display screen in a state of being divided into a tape display area for display a tape and a data file display area for display the data file so that the tape display area and the data file display area are displayed at the same time in the display screen;

a print data selecting step of selecting plural pieces of label data from the data file displayed in the data file display area;

a print data creating step of creating print data to be printed on the tape from the label data selected at the print data selecting step;

a model tape display controlling step of creating a model tape indicative of a state where the print data is printed on the tape, and displaying the model tape in the tape display area;

a model data file display controlling step of creating a model data file indicative of a state where a plurality of label data stored in the data file are arranged in a predetermined matrix, and displaying the plural label data in the data file display area; and a file display size determining step of determining whether or not the model data file is entirely displayed in the data file display area, wherein, if it is determined that the model data file is not entirely displayed in the data file display area at the file display size determining step, the model data file is compressed so that the model data file can be entirely displayed in the data file display area; and wherein said display screen is separate from a label printer for printing the print data onto a long tape.

8. The recording medium according to claim 7, wherein, if it is determined that the model data file is not entirely displayed in the data file display area at the file display size determining step, the tape display area is compressed in a predetermined direction on the display screen, and at the same time, the data file display area is expanded in the predetermined direction.

9. The recording medium according to claim 7, wherein the computer program further comprises an instructing step of instructing to display the model data file in a parallel state by repeatedly turning the model data file at a lower end portion of the data file display area, and wherein, if it is determined that the model data file is not entirely displayed in the data file display area at the file display size determining step and if it is instructed to display the model data file in the parallel state at the instructing step, the model data file is displayed in a parallel state by repeatedly turning the model data file at the lower end portion of the data file display area.

10. The recording medium according to claim 7, wherein the computer program further comprises a tape display size determining step of determining whether or not the model tape is entirely displayed in the tape display area, and wherein, if it is determined that the model tape is not entirely displayed in the tape display area at the tape display size determining step, the model tape is compressed to be entirely displayed in the tape display area.

11. The recording medium according to claim 7, wherein the computer program further comprises a layout change instructing step of instructing to switch a display layout from one to the other between a first divided displayed state where the display screen is vertically divided into upper and lower portions in which the tape display area and the data file display area are displayed respectively, and a second divided displayed state where the display screen is laterally divided into left and right portions in which the tape display area and the data file display area are displayed respectively, and wherein, if it is instructed to change the display layout at the layout change instructing step, it is controlled to display the tape display area and the data file display area in the other display state at the divided display controlling step.

12. The recording medium according to claim 7, wherein the data file comprises an element data file that stores plural pieces of element data composed of a combination of plural kinds of label data, wherein the model data file displayed at the model data file display controlling step comprises a model element data file indicative of a state where combinations of plural kinds of fields each corresponding to each of the plural kinds of label data are arranged in a row direction of the predetermined matrix, whereas the element data are arranged in a column direction of the predetermined matrix, wherein the computer program further comprises a field selecting step of selecting a field to be displayed in the data file display area from plural kinds of fields in the model element data file, and wherein, if a field is selected at the field selecting step, a second model element data file indicative of a state where only the selected field of the model element data file is arranged in the row direction of the predetermined matrix is created and the second model element data file is displayed in the data file display area at the model data file display controlling step.

* * * * *